United States Patent
Fujii et al.

(10) Patent No.: US 8,495,812 B2
(45) Date of Patent: Jul. 30, 2013

(54) METHOD OF MANUFACTURING MAGNETIC HEAD SLIDER

(75) Inventors: Ryuji Fujii, Hong Kong (CN); Jian Hui Huang, Hong Kong (CN); Anthony Reymund Melad Binarao, Hong Kong (CN); Shao Hui Yang, Hong Kong (CN); Tatsuya Shimizu, Hong Kong (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 1151 days.

(21) Appl. No.: 12/292,809

(22) Filed: Nov. 26, 2008

(65) Prior Publication Data

US 2009/0154020 A1 Jun. 18, 2009

(30) Foreign Application Priority Data

Dec. 18, 2007 (CN) .......................... 2007 1 0305024
Jan. 24, 2008 (JP) ................................. 2008-013627

(51) Int. Cl.
*G11B 5/127* (2006.01)
(52) U.S. Cl.
USPC ......................................... 29/603.13; 29/417
(58) Field of Classification Search
None
See application file for complete search history.

(56) References Cited

U.S. PATENT DOCUMENTS

| 6,999,280 B2* | 2/2006 | Otsuka ........................ 360/234.7 |
| 2005/0180048 A1* | 8/2005 | MacDonald et al. ......... 360/125 |
| 2006/0265862 A1* | 11/2006 | Murakoshi ................. 29/603.16 |

FOREIGN PATENT DOCUMENTS

| JP | 08-227513 | 9/1996 |
| JP | 2004-039148 | 2/2004 |
| JP | 2006-252756 | 9/2006 |

OTHER PUBLICATIONS

English machine translation of JP 2004-39148, Japan, Feb. 5, 2004.*
English machine translation of JP 2006-252756, Cha et al, Japan, Sep. 2006.*
Office Action issued on Oct. 9, 2012 in corresponding Japanese Application No. 2008-013627.

* cited by examiner

*Primary Examiner* — Holly Rickman
(74) *Attorney, Agent, or Firm* — Nixon & Vanderhye PC

(57) ABSTRACT

A method of manufacturing a highly reliable magnetic head slider, with a simplified manufacturing process which provides reduction in manufacturing time and costs, is provided. The manufacturing method includes a multi-layer forming step for forming a magnetic head section in a multi-layered manner, the magnetic head section including a read element and/or a write element and a magnetic shield for magnetically shielding the read element and/or the write element, and the magnetic head slider is manufactured by being cut off from a multi-layered body having the magnetic head section. The manufacturing method further includes, after the multi-layer forming step, a shield end removing step for removing end portions in a width direction of the magnetic shield located on the flying surface side of the magnetic head slider.

8 Claims, 24 Drawing Sheets

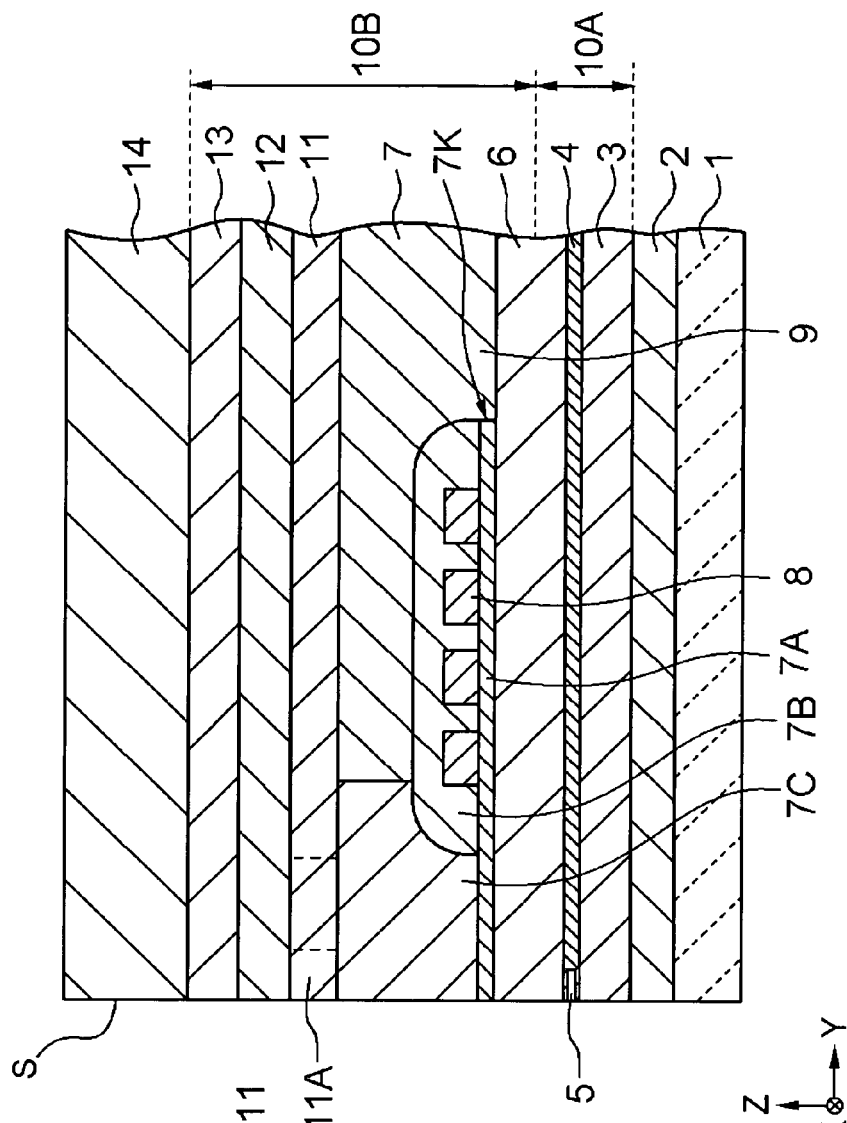
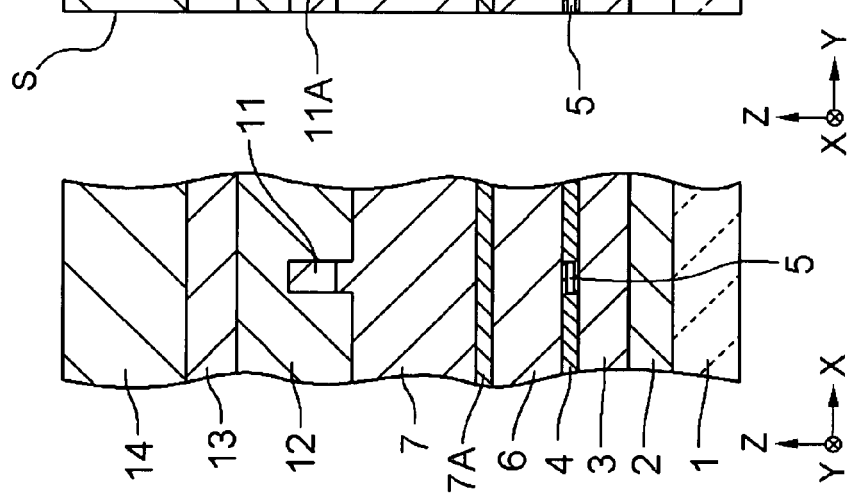

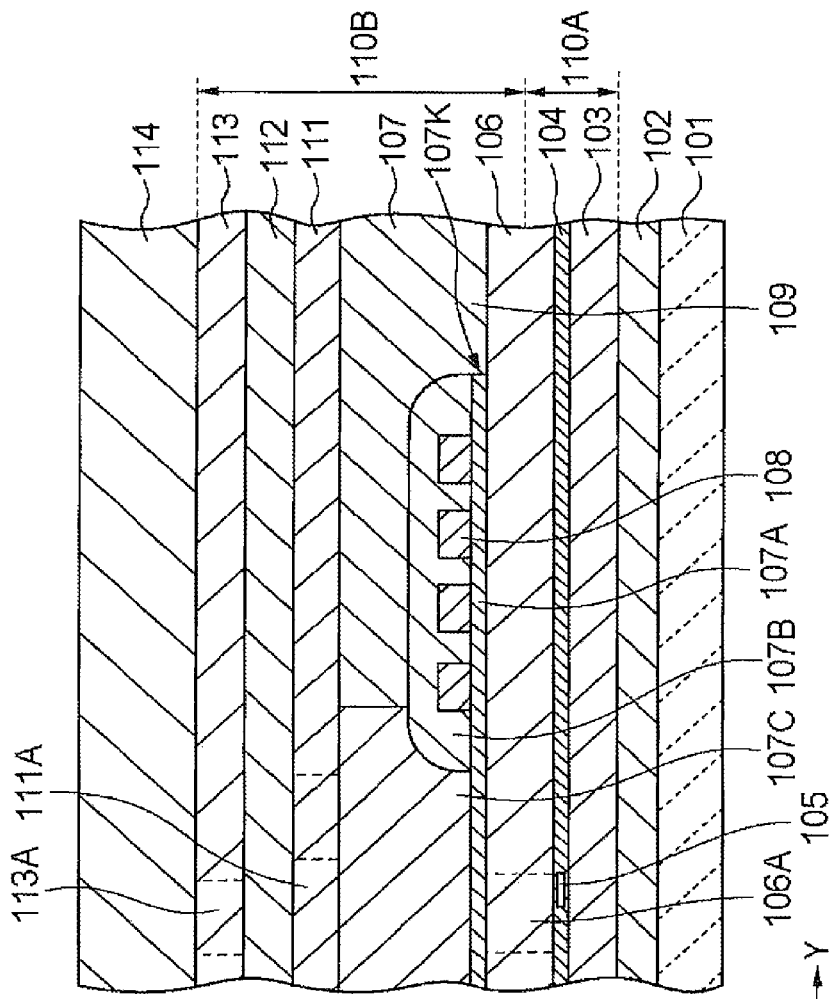

FIG. 24
(PRIOR ART)
| | CONVENTIONAL | PATENT DOCUMENT 1 |
|---|---|---|
| MAGNETIC FIELD INTENSITY |  |  |
| RETURN YOKE SHAPE |  206 | 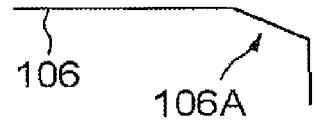 106  106A |

METHOD OF MANUFACTURING MAGNETIC HEAD SLIDER

The application claims the benefit of CN 200710305024.8, filed on Dec. 18, 2007, and JP 2008-013627, filed on Jan. 24, 2008, the entire contents of each of which are hereby incorporated herein by reference.

BACKGROUND OF THE INVENTION

1. Technical Field

The present invention relates to a method of manufacturing a magnetic head slider, and in particular, to a method of manufacturing a magnetic head slider having a magnetic head section composed of thin-films.

2. Related Art

The recording density of a magnetic disk device has been advanced remarkably in recent years and is still increasing, and a recording method called longitudinal recording in which magnetic data is written horizontally with respect to the disk surface has been mainly adopted. In the longitudinal recording, however, as the magnetic poles repel each other, it is difficult to realize a higher density. Even if a recoding density can become higher by making the film thickness of the recording medium thinner so as to suppress repelling of the magnetic poles, a problem of heat disturbance that the recording magnetization becomes unstable due to the heat energy of the room temperature is unavoidable. As such, a magnetic disk device utilizing perpendicular recording, capable of increasing the recording density, is realized recently.

As perpendicular recording, a method of recording data with used of a head (single magnetic-pole type) arranged perpendicularly to a hard disk has been used. In this method, a magnetic field is applied to a recording layer interposed between a lining soft magnetic layer of a bilayer recording medium and a single magnetic-pole head so as to magnetize the magnetic body of the recording medium in a direction perpendicular to the disk surface to thereby record data. This method has a characteristic that a demagnetizing field acting on between adjacent bits is decreased as the linear recording density is increased, so that the stability of the recording magnetization is maintained.

Now, a method of manufacturing a magnetic head slider having a thin-film magnetic head of a perpendicular recording method according to a conventional example, disclosed in Japanese Patent Laid-Open Publication No. 2004-39148 (Patent Document 1), will be described with reference to FIGS. 14 to 24.

A magnetic head according to Patent Document 1 is formed such that a magnetic head section 110 having a multi-layered thin-film structure is formed on a base 100 as shown in FIG. 15A (step S101 in FIG. 14, wafer step), by means of existing thin-film processes including a film deposition technique such as plating and sputtering, a patterning technique utilizing photolithography and etching, and a lapping technique such as machining and lapping, in a multi-layer forming step. The configuration of the multi-layered magnetic head section 110 formed in the multi-layer forming step will be described with reference to FIGS. 17A and 17B. 17B is a side sectional view of the magnetic head section 110, and FIG. 17A is a sectional view in which the magnetic head of FIG. 17B is viewed from the left side.

The magnetic head section 110 is configured such that on a substrate 101 (base 100) made of a ceramic material such as AlTiC ($Al_2O_3$.TiC), an insulating layer 102 made of aluminum oxide for example ($Al_2O_3$; hereinafter simply referred to as "alumina"), a read head unit 110A which performs a reading process with use of magneto-resistance effect (MR), and a write head unit 110B which performs a writing process by means of a perpendicular recording method, and an overcoat layer 114 made of alumina for example, are layered in this order. Hereinafter, the read head unit 110A and the write head unit 110B will be described in more detail.

The read head unit 110A is configured such that a lower shield layer 103, a shield gap film 104, an upper shield and return yoke layer (hereinafter simply referred to as "return yoke layer") 106 are laminated in this order, for example. In the shield gap film 104, an MR element 105 serving as a magnetic reading device is buried such that one end face thereof is exposed on the air bearing surface S (flying surface) described later. The lower shield layer 103 and the return yoke layer 106 are mainly for magnetically shielding the MR element 105 from the environment. The lower shield layer 103 and the return yoke layer 106 are made of a magnetic material such as nickel-iron alloy (NiFe (hereinafter simply referred to as "permalloy (trade name)"); Ni: 80 weight %, Fe: 20 weight %).

Further, the shield gap film 104 works to magnetically and electrically separate the MR element 105 from the lower shield layer 103 and the return yoke layer 106. The shield gap film 104 is made of a non-magnetic and non-conductive material such as alumina, for example. The MR element 105 performs a reading process by means of giant magneto-resistive effect (GRM) and a tunneling magneto-resistive effect (TMR), for example.

The write head unit 110B is configured such that the return yoke layer 106, a gap layer 107 and a yoke layer 109 in which a thin-film coil 108 is buried, a magnetic pole layer 111 magnetically connected with the return yoke layer 106 via the yoke layer 109 through an aperture 107K formed in the gap layer 107, an insulating layer 112, and a write shield layer 113, are layered in this order. As described above, the return yoke layer 106 works to magnetically shield the MR element 105 from the environment in the read head unit 110A, and also works to flow back a magnetic flux output from the magnetic pole layer 111 via a hard disk (not shown) in the write head unit 110B. The return yoke layer 106 is made of a magnetic material such as permalloy (Ni: 80 weight %, Fe: 20 weight %), for example.

The gap layer 107 is disposed on the return yoke layer 106, and is configured to include a gap layer portion 107A in which the aperture 107K is formed, a gap layer portion 107B disposed on the gap layer portion 107A and covering parts between the windings of the thin-film coil 108 and the surrounding area, and a gap layer portion 107C disposed to partially covering the gap layer portions 107A and 107B. The gap layer portion 107A is made of a non-magnetic and non-conductive material such as alumina, for example. The gap layer portion 107B is made of photoresist (photosensitive resin) or spin-on-glass (SOG) which shows flow characteristics when heated, for example. The gap layer portion 107C is made of a non-magnetic and non-conductive material such as alumina or silicon oxide ($SiO_2$), and the thickness thereof is larger than that of the gap layer portion 107B.

The thin-film coil 108 mainly works to generate a magnetic flux for writing. The thin-film coil 108 is made of a high-conductive material such as copper (Cu) for example, having a winding structure which spirally winds around the linked part of the return yoke layer 106 and the yoke layer 109. It should be noted that FIG. 17B shows only a part of a plurality of windings constituting the thin-film coil 108. Further, the yoke layer 109 works to magnetically link the return yoke layer 106 and the magnetic layer 111, and is made of a magnetic material such as permalloy (Ni: 80 weight %, Fe: 20 weight %).

Further, the magnetic pole layer 111 mainly works to contain a magnetic flux generated in the thin-film coil 108, and outputs the magnetic flux to a magnetic disk (not shown). The magnetic pole layer 111 is made of an iron-cobalt alloy (FeCo), an iron-based alloy (Fe-M; M is a metal element of 4A, 5A, 6A, 3B, 4B group), or nitride of each of the alloys. The insulating layer 112 mainly works to magnetically and electrically separate the magnetic pole layer 111 and the write shield layer 113, and is made of a non-magnetic and non-conductive material such as alumina. The write shield layer 113 mainly works to magnetically shield the magnetic pole layer 111 from the environment, and is made of a magnetic material such as permalloy (Ni: 80 weight %, Fe: 20 weight %).

Next, the detailed configuration of the main part of the thin-film magnetic head will be described with reference to FIG. 18. FIG. 18 shows an enlarged plan configuration of the main part of the magnetic head section 110. That is, in FIG. 18, the magnetic head section shown in FIG. 17A is viewed from the above. It should be noted that the return yoke layer 106, the magnetic pole layer 111, and the write shield layer 113 will be described herein as the main part of the magnetic head section.

The return yoke layer 106, the magnetic pole layer 111, and the write shield layer 113 are formed such that one end portion of each of them is exposed on the cut-off surface S' when a bar block is cut off from a multi-layered body in which the magnetic head section 110 is stacked on the base 100, as described later. A portion, exposed on the cut-off surface S', of the magnetic pole layer 111 is formed as an ultrasmall tip portion 111A having a certain width defining a recording truck width on a disk. The tip portion 111A is formed such that the width thereof is reduced from the back end portion 111B. Further, the return yoke layer 106 and the write shield layer 113 are formed in a shape that the end portions in the width direction are removed in the cut-off surface S'. More specifically, the return yoke layer 106 and the write shield layer 113 form tapered inclined surfaces 106A and 113A which are inclined by a predetermined angle with respect to the cut-off surface S', respectively. The shapes of the layers 106, 111 and 113 are formed in the multi-layer forming step (wafer step), respectively.

Then, as shown in FIG. 15B, a bar block 130 is cut off from the base 100 (layered body) in which the magnetic head section 110 having the above structure is stacked (step S102 of FIG. 14). In this step, the bar block 130 is cut at the cut-off surface S' shown in FIG. 18. Then, the cut-off surface S' is lapped to a position forming a flying surface S (step S103 of FIG. 4) as shown in the sectional view of FIG. 19 and in the top view of the FIG. 10, to thereby adjust the MR element 105 which is a read element and the length of the tip portion 111A of the magnetic pole layer 111 which is a write element. Thereby, as shown in the perspective view of FIG. 22, the end portions in the width direction of the return yoke layer 106 and the write shield layer 113 are removed to be in a tapered shape (inclined surfaces 106A and 113A) on the flying surface S of the magnetic head section 110. However, an insulator 115 such as alumina is buried on the tip sides and in the surroundings of the tapered inclined surfaces 106A and 113A, as shown in FIG. 21.

Then, with respect to the bar block 130 shown in FIG. 16A, an ABS having a predetermined shape is formed on the flying surface S of a magnetic head slider 131 (step S104 in FIG. 14). Then, the bar block 130 is cut into respective magnetic head sliders 131 by a slider cutter (step S105 of FIG. 14). Thereby, a magnetic head slider 131 is formed in which the base 100 forms a slider portion 100 and the magnetic head section 110 is provided at the end thereof, as shown in FIG. 16B.

Then, a head gimbal assembly is formed with the magnetic head slider 131 manufactured as described above, and further, a magnetic disk device is formed by incorporating the head gimbal assembly. Here, writing operation by the magnetic head slider incorporated in the magnetic disk device will be described with reference to FIG. 23A.

When writing data, in the magnetic head section 110, when an electric current flows in the thin-film coil 108 of the write head unit 110B through an outside circuit not shown, a magnetic flux J1 is generated in the thin-film coil 108. The generated magnetic flux J1 is stored in the magnetic pole layer 111 via the yoke layer 109, and is output from the end surface (flying surface S) of the magnetic pole layer 111 to the write layer 302 of the magnetic disk 300, and then is flown back to the return yoke layer 106 through the back layer 301. At this time, a magnetic field (perpendicular magnetic field) for magnetizing the write layer 302 in a direction orthogonal to the surface thereof is generated according to the magnetic flux J1 output from the magnetic pole layer 111, and with the write layer 302 being magnetized by the perpendicular magnetic field, information is written on the magnetic disk 300.

In contrast, when reading data, when a sense current flows in the MR element 105 of the read head unit 110A, the resistance value of the MR element 105 varies according to the signal magnetic field for reading generated from the write layer 302 of the magnetic disk 300. By detecting the resistance variation as changes in the sense current, information written on the magnetic disk 300 is read.

In the magnetic head section 110 of the Patent Document 1, as the both edge sides of the return yoke layer 106 has two tapered inclined surfaces 106A and the both edge sides of the write shield layer 113 has two tapered inclined surfaces 113A, it is possible to prevent generation of track erase which is an unnecessary writing process, and to improve reliability of the magnetic recording operation.

It should be noted that FIG. 23B shows another conventional magnetic head section in which no tapered inclined surface is formed at the end portions in a width direction of the return yoke layer 106 and the like, indicating the flow of a magnetic flux when writing of the magnetic head section. Further, FIG. 24 schematically shows the shape of the return yoke layer (conventional; no tapered surface, Patent Document 1; with tapered surfaces), and measurement results relating to correlation with the magnetic field intensity. First, in the conventional magnetic head section as shown in FIG. 23B, the return yoke layer 206 has no tapered inclined surface 106A as in the Patent Document 1, and the return yoke layer 206 is formed to be in a complete rectangle having two corners 206B. Further, the write shield layer 213 also has no tapered inclined surface 113A, and is formed to be in a complete rectangle shape having two corners 231B.

In the conventional magnetic head section as shown in FIG. 23B, when a magnetic flux J2 output from the magnetic pole layer 211 is flown back to the return yoke layer 206, the reflux magnetic flux J2 locally concentrates on the corners 206B of the return yoke layer 206. Similarly, the magnetic flux J2 from the magnetic pole layer 111 and an outside magnetic flux locally concentrate on the corners 213B of the write shield layer 213. As such, as shown in FIG. 24, the magnetic field intensity extremely increases locally in the periphery of the respective corners 206B and 213B of the return yoke layer 206 and the write shield layer 213. Consequently, an unintentional perpendicular magnetic field is generated due to the magnetic flux concentrated on the corners 206B and 213B, whereby an unnecessary writing process is performed to the magnetic disk 300, so that track erase is caused. This may reduce the reliability of the magnetic recording operation.

In contrast, as shown in FIG. 23A, as the return yoke layer 106 has tapered inclined surfaces 106A and the write shield layer 113 has tapered inclined surfaces 113A respectively in the magnetic head section 110 of Patent Document 1, there is no corner which may induce concentration of a magnetic flux, so that magnetic field intensity is never concentrated locally in the periphery of the inclined surfaces 106A and 113A. Accordingly, in the Patent Document 1, concentration of a magnetic flux which has been a problem in the conventional magnetic head section is prevented, and so the rate of occurrence of an unnecessary writing process is lowered, whereby it is possible to prevent generation of track erase and to improve reliability of the magnetic writing operation.

[Patent Document 1] JP 2004-39148 A

However, in the method of manufacturing a magnetic head slider disclosed in Patent Document 1, as tapered inclined surfaces are formed on the both end sides in a width direction of the return yoke layer and the write shield layer in the thin-film layered process (wafer step), steps in forming a multi-layer such as patterning become complicated. This leads to problems that the manufacturing time becomes longer and the manufacturing costs increase. Further, as the shape is formed in the thin-film layered process, an insulator is actually buried in the surroundings of the tapered inclined surfaces, so that the possibility that such a part contacts the magnetic disk increases. As a result, the reliability of the magnetic disk device cannot be improved.

SUMMARY OF THE INVENTION

It is therefore an object of the present invention to solve the inconveniences involved in the conventional examples, and in particular, to manufacture a magnetic head slider having high reliability in reading and writing of data and to simplify the manufacturing process of the magnetic head slider to thereby reduce the manufacturing time and costs.

In order to achieve the above object, an aspect of the present invention is a method of manufacturing a magnetic head slider, including a multi-layer forming step for forming a magnetic head section in a multi-layered manner, the magnetic head section including a read element and/or a write element and a magnetic shield for magnetically shielding the read element and/or the write element, in which the magnetic head slider is manufactured by being cut off from a multi-layered body formed in a multi-layered manner including the magnetic head section. After the multi-layer forming step, the method includes a shield end removing step for removing end portions in a width direction of the magnetic shield located on the flying surface side of the magnetic head slider. It should be noted that the magnetic shield has a function of flowing back a magnetic flux generated from the write element.

Following the multi-layer forming step, the method includes a bar block cut-off step for cutting off a bar block having a plurality of magnetic head sliders from the multi-layered body, and a slider cutting step for cutting the bar block into respective magnetic head sliders. The shield end removing step is performed after the bar block cut-off step.

The shield end removing step includes a mask forming step for forming, on the flying surface of the magnetic head slider, a mask covering the read element and/or the write element and a center portion of the magnetic shield except for the end portions in the width direction thereof, and a removing step for removing a portion uncovered by the mask to a predetermined depth from the flying surface side.

According to the above-described invention, the end portions in the width direction of the magnetic shield are removed from the flying surface side of the magnetic head slider after the magnetic head section is formed in a multi-layered manner in the process of manufacturing the magnetic head slider. Thereby, when reading and writing data, a magnetic flux never concentrates on the end portions of the magnetic shield, and occurrence of traffic erase can be prevented. In particular, as the end portions of the magnetic shield are removed from the flying surface side not during the multi-layer forming step but after that step, even if there are a plurality of magnetic shields, the end portions of those shields can be removed simultaneously, so that the manufacturing process can be simplified. Consequently, the manufacturing time can be reduced, and further, the manufacturing costs can also be reduced.

Further, in the shield end removing step, the end portions in the width direction of the magnetic shield exposed on the flying surface and an insulator formed around the end portions are removed. Thereby, as the end portions of the magnetic shield and the surrounding insulator are removed, the distance between the magnetic head section and a magnetic disk can be longer when reading and writing data. Accordingly, it is possible to prevent the magnetic head section from contacting the magnetic disk, whereby reading and writing of data can be stabilized and durability of the magnetic head can be improved.

Further, before or after the slider cutting step, the method includes an ABS forming step for forming an air bearing surface in a predetermined shape on the flying surface of the magnetic head slider, and the shield end removing step is performed as a part of the ABS forming step. Thereby, the process of removing the end portions of the magnetic shield can be performed during formation of the ABS, so that the manufacturing process can be further reduced.

Further, the shield end removing step includes a DLC step for forming a diamond-like carbon layer on the flying surface before a mask forming step. Further, the shield end removing step includes, after the removing step, a second DLC forming step for further forming a diamond-like carbon layer on the flying surface, and thereafter, a DLC removing step for removing all of the diamond-like carbon layer formed on the flying surface after performing a predetermined process on the flying surface. Further, after the ABS forming step, the method includes a third DLC forming step for forming a diamond-like carbon layer covering the flying surface. Thereby, the flying surface can be protected by the diamond-like carbon layer when forming the mask, removing the shield, forming the ABS, and the like. Further, the flying surface of the magnetic head slider can also be protected finally by the diamond-like carbon layer.

Another aspect of the present invention is a magnetic head slider having a magnetic head section formed in a multi-layered manner, including a read element and/or a write element and a magnetic shield for magnetically shielding the read element and/or the write element, in which end portions in a width direction of the magnetic shield located on the flying surface side of the magnetic head slider are removed, and a portion of the magnetic shield where the end portions are removed is exposed on the flying surface. Further, the end portions in the width direction located on the flying surface side of the magnetic head slider and an insulator provided around the end portions are removed, and a portion of the magnetic shield where the end portions and the insulator are removed is exposed on the flying surface. Furthermore, a diamond-like carbon layer is formed all over the flying surface.

Further, the present invention provides a head gimbal assembly having a magnetic head slider manufactured by the above-described method or a magnetic head slider having the above-described configuration, and further, a magnetic disk device having the head gimbal assembly.

As the present invention is formed and operates as described above, the magnetic head slider is manufactured such that concentration of a magnetic flux on end portions of the magnetic shield above a magnetic disk can be avoided. As such, it is possible to prevent occurrence of track erase, whereby reliability in data reading and writing can be improved. Further, in the manufacturing process, as the end portions of the magnetic shield are removed not during the multi-layer forming step but after that step, even if there are a plurality of magnetic shields, the end portions of those shields can be removed simultaneously. This can simplify the manufacturing process. Consequently, the manufacturing time can be reduced, and further, the manufacturing costs can also be reduced. Further, as no other object such as an insulator is present around the portion where the end portions are removed of the magnetic shield and the removed portions become empty spaces, the distance between the magnetic head section and a magnetic disk can be longer. This also enables to prevent a contact between them, and to further improve the reliability.

BRIEF DESCRIPTION OF THE DRAWINGS

FIG. 3A is a cross-sectional view showing the layered structure of a magnetic head section;

FIG. 3B is a cross-sectional view showing the layered structure of the magnetic head section;

FIG. 17A is a cross-sectional view showing the layered structure of a magnetic head section of the conventional example;

FIG. 17B is a cross-sectional view showing the layered structure of a magnetic head section of the conventional example;

FIG. 24 is a table schematically showing the measurement results relating to correlation between the shape of a return yoke layer and its magnetic field intensity in conventional examples.

DESCRIPTION OF PREFERRED EMBODIMENTS

The present invention is characterized in a method of removing end portions in a width direction exposed on the flying surface of a magnetic shield constituting a part of a magnetic head section, and also characterized in the structure of the magnetic head section manufactured in that manner. Hereinafter, the present invention will be described in accordance with an embodiment.

First Embodiment

Figure 1:
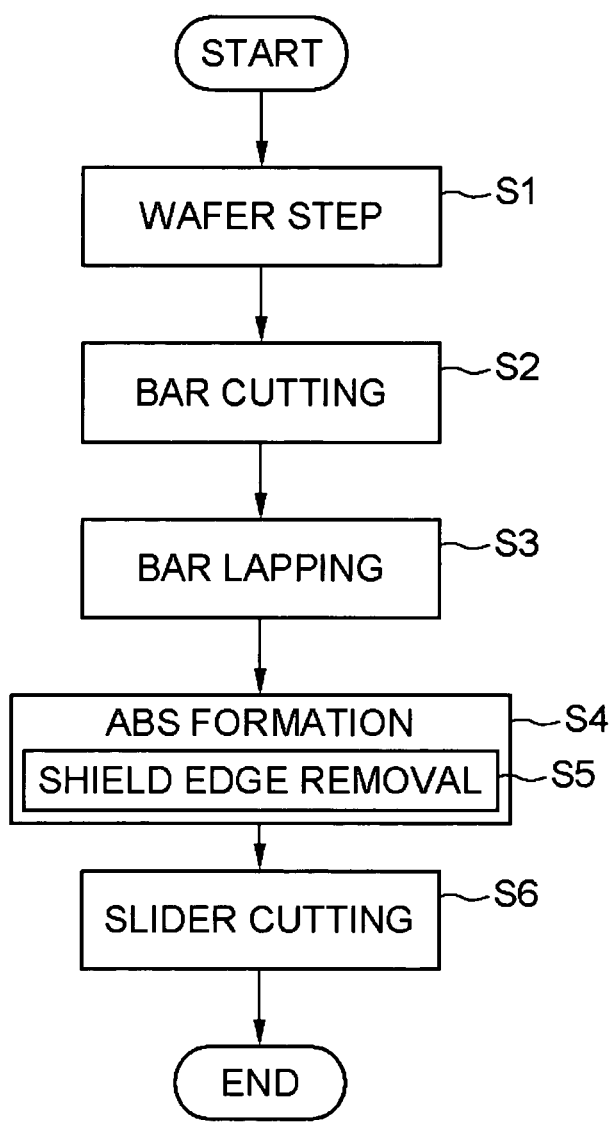
FIG. 1 is a flowchart showing a method of manufacturing a magnetic head slider.
Figure 2:
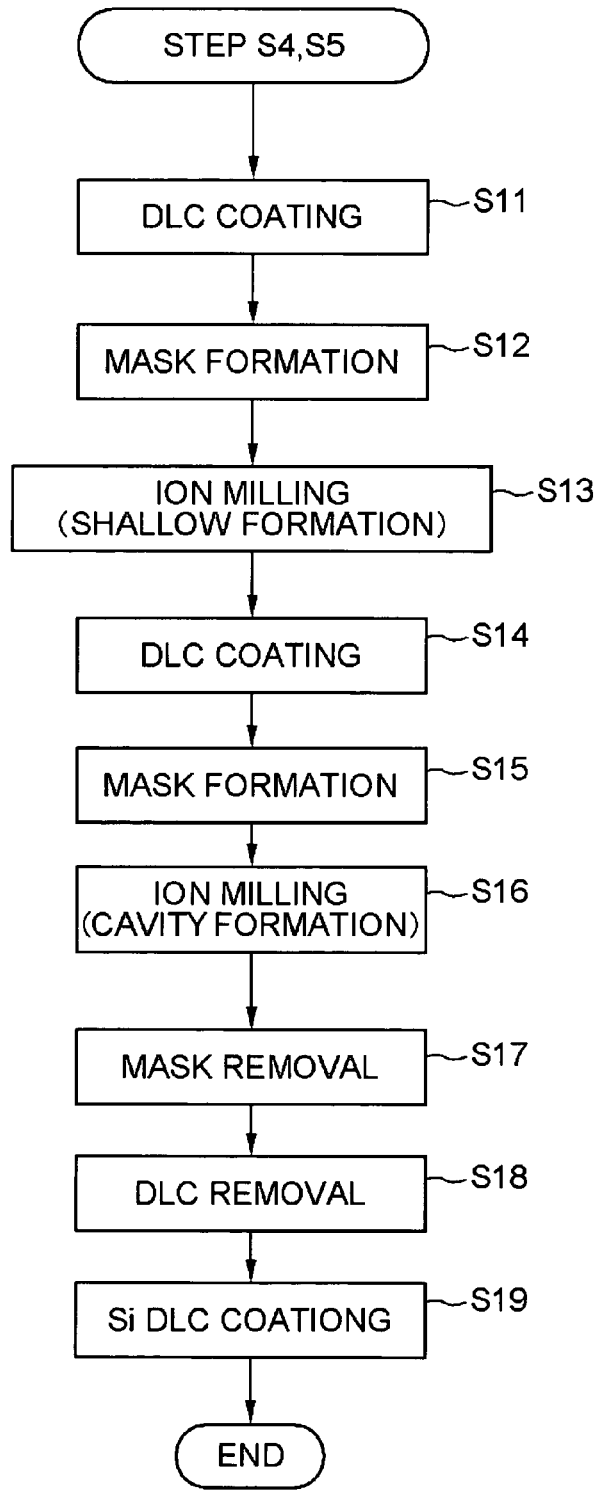
FIG. 2 is a flowchart showing a method of manufacturing a magnetic head slider, in which a part of the steps shown in FIG. 1 is described in detail.
Figure 12:
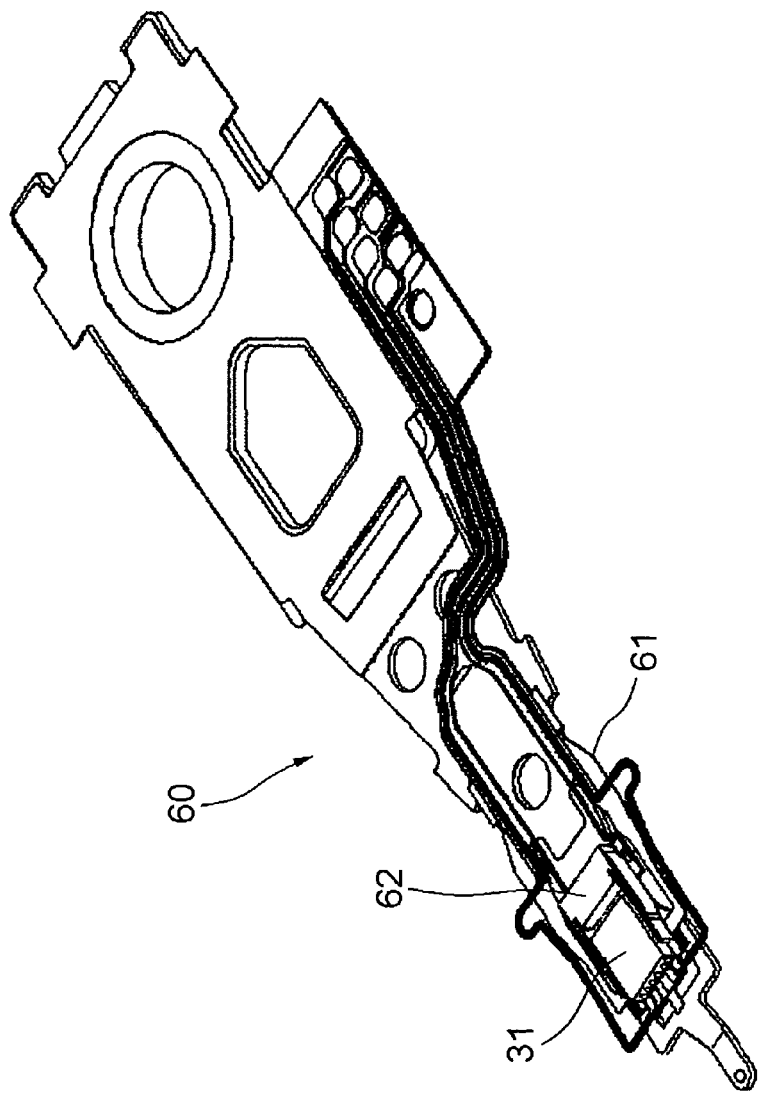
FIG. 12 is a diagram showing a head gimbal assembly on which a magnetic head slider is mounted.
Figure 13:
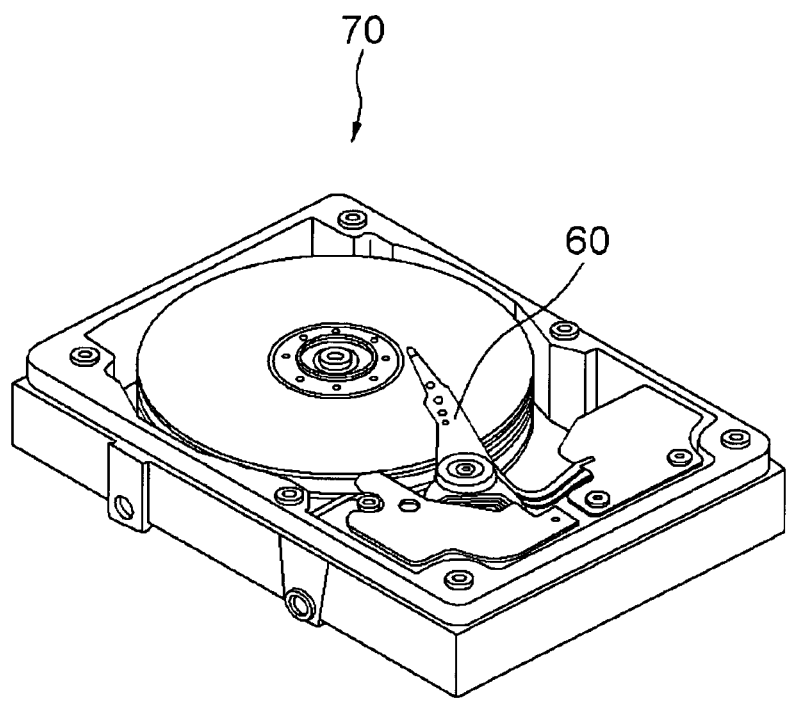
FIG. 13 is a diagram showing a magnetic disk device provided with the head gimbal assembly.
Figure 14:
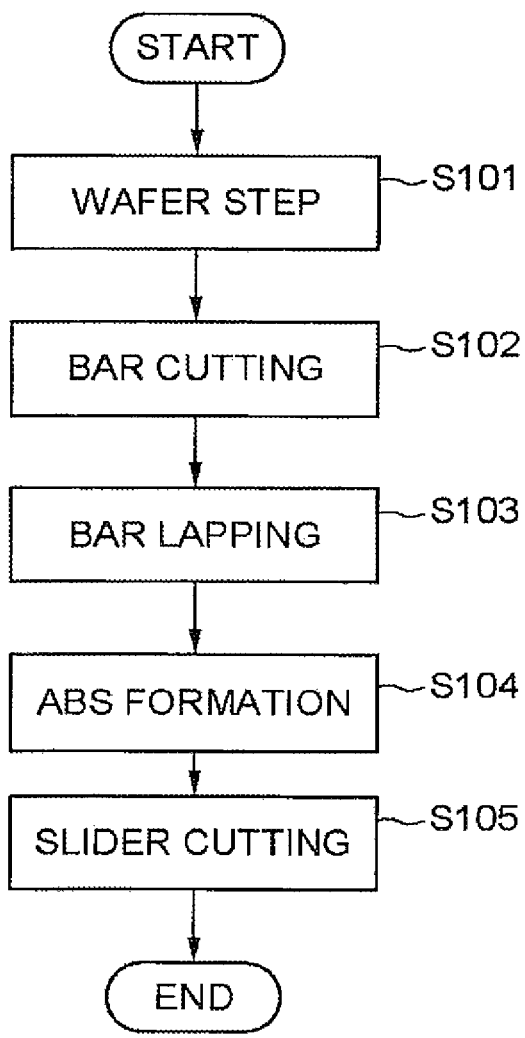
FIG. 14 is a flowchart showing a method of manufacturing a magnetic head slider of a conventional example.

A first embodiment of the present invention will be described with reference to FIGS. 1 to 13. FIGS. 1 and 2 are flowcharts showing a method of manufacturing a magnetic head slider. FIGS. 3A to 6 are diagrams showing the configuration of a magnetic head slider. FIGS. 7A to 11 are diagrams showing respective steps in manufacturing a magnetic head slider. FIG. 12 shows a head gimbal assembly on which a manufactured magnetic head slider is mounted, and FIG. 13 shows a magnetic disk device on which the head gimbal assembly is mounted.

(Outline of Magnetic Head Slider Manufacturing Method)

First, an outline of a method of manufacturing a magnetic head slider 31 will be described. As the basic procedures are almost the same as those described in Patent Document 1, FIGS. 15 and 16 are also referred to in the description.

Figure 15A:
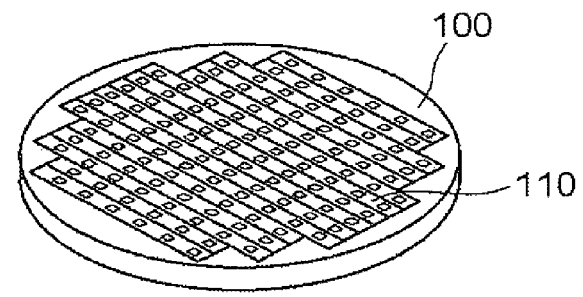
FIG. 15A is a diagram showing a state of a particular step in manufacturing a magnetic head slider of the conventional example.

As shown in FIG. 15A, first, a magnetic head section 110 (indicated by a reference numeral 10 in the present embodiment) having a plurality of thin film layers is formed in a layered manner on a base 100 made of ceramic material or the like in a multi-layer forming step (wafer step (step S1 in FIG. 1)) using photolithographic approach for example. In the multi-layer forming step, a layer material is deposited by a sputtering device or the like on the base 100 mounted on a table, for example. Then, if required, resist, exposure and development are applied to the deposited thin film to thereby form the thin film layer to be in a desired shape by an etching device or the like. Thereby, as shown in FIG. 15A, a plurality of magnetic head sections 110 are formed on almost all over the base 100. In the present embodiment, no inclined portions are formed in respective magnetic shields such as the return yoke layer 106 and the write shield layer 113, which have been mentioned in the description of Patent Document 1, in the multi-layer forming step. This will be described later.

Figure 15B:
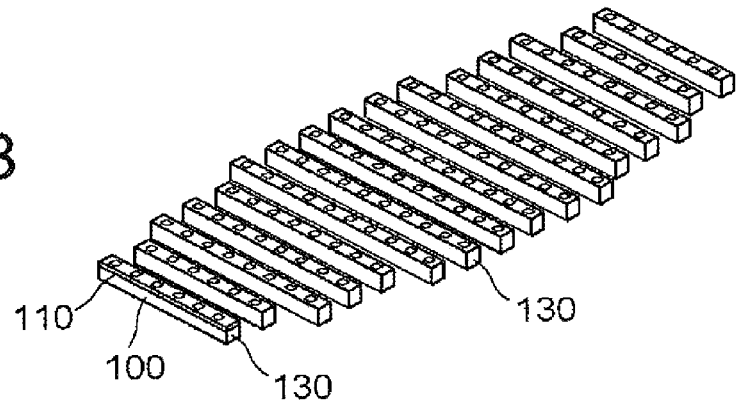
FIG. 15B is a diagram showing a state of a particular step in manufacturing the magnetic head slider of the conventional example.
Figure 16A:
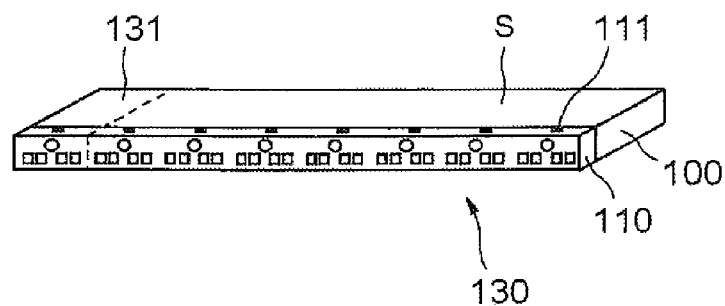
FIG. 16A is a diagram showing a state of a particular step in manufacturing the magnetic head slider of the conventional example.
Figure 16B:
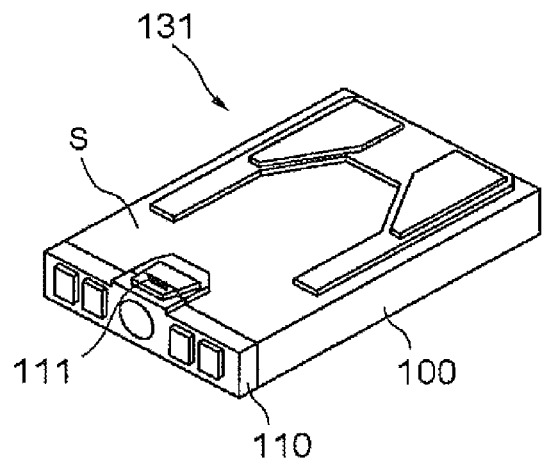
FIG. 16B is a diagram showing a state of a particular step in manufacturing the magnetic head slider of the conventional example.
Figure 18:
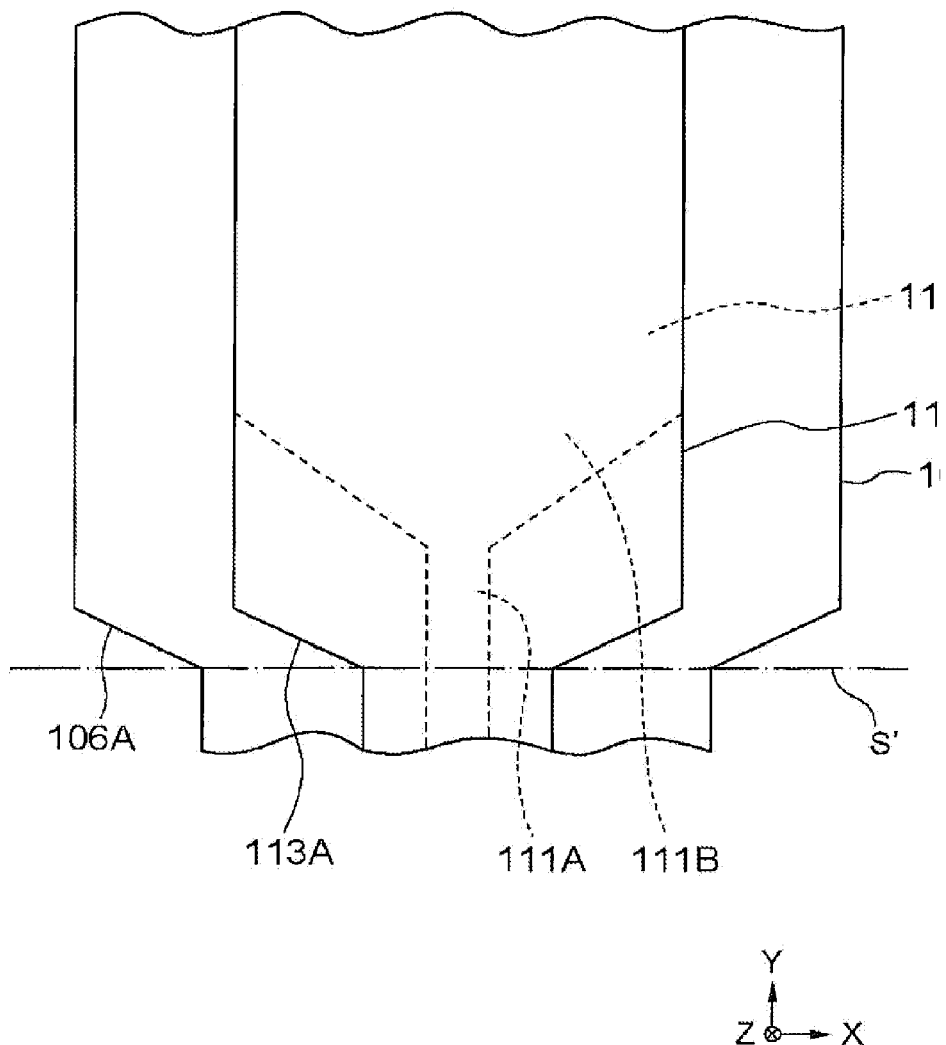
FIG. 18 is a top view showing the layered structure of the magnetic head section of the conventional example.
Figure 19:
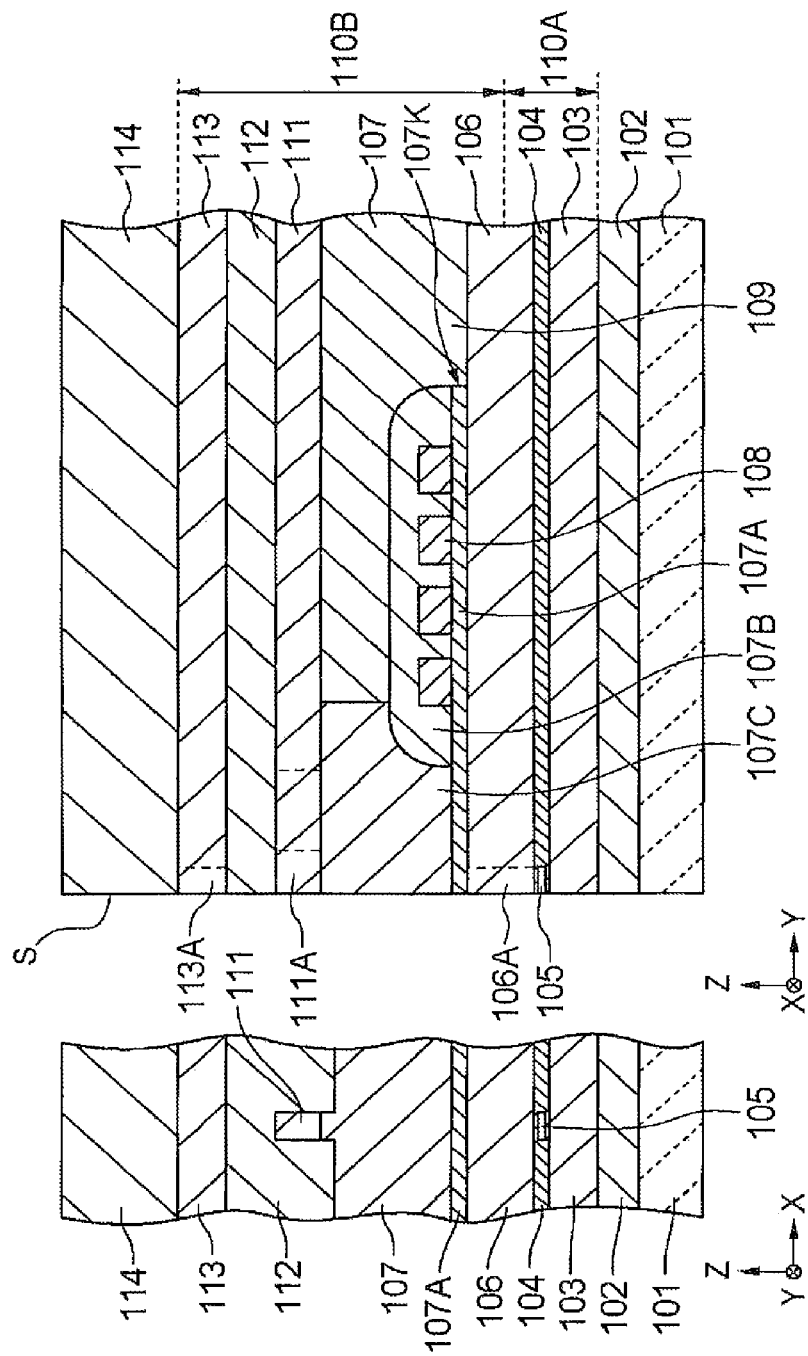
FIG. 19A is a cross-sectional view showing the layered structure of the magnetic head section of the conventional example.
FIG. 19B is a cross-sectional view showing the layered structure of the magnetic head section of the conventional example.
Figure 20:
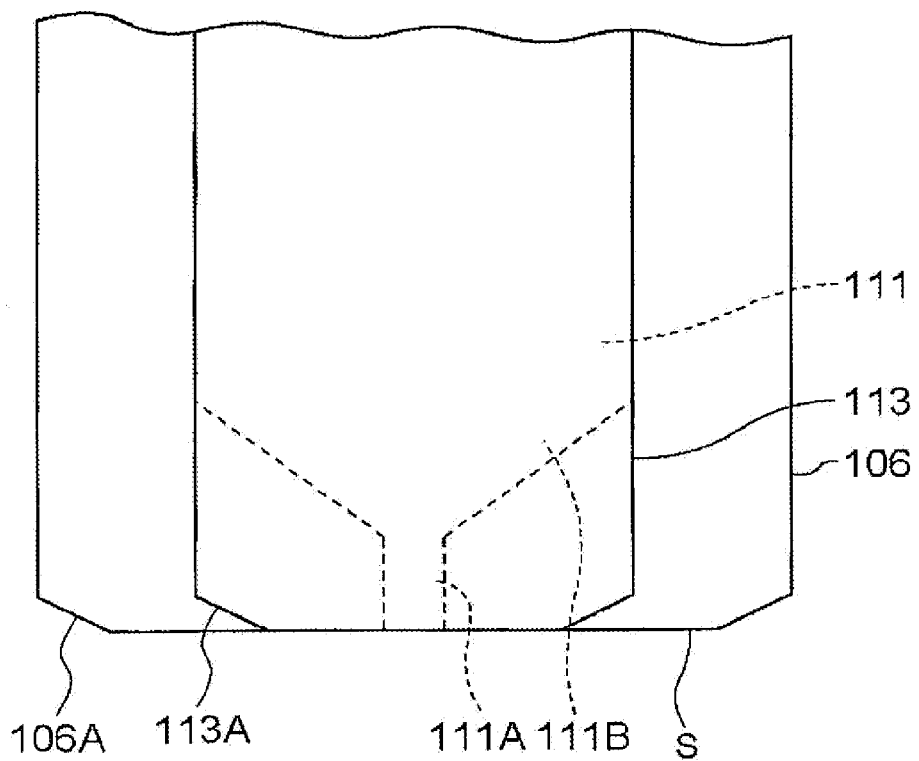
FIG. 20 is a top view showing the layered structure of the magnetic head section of the conventional example.
Figure 21:
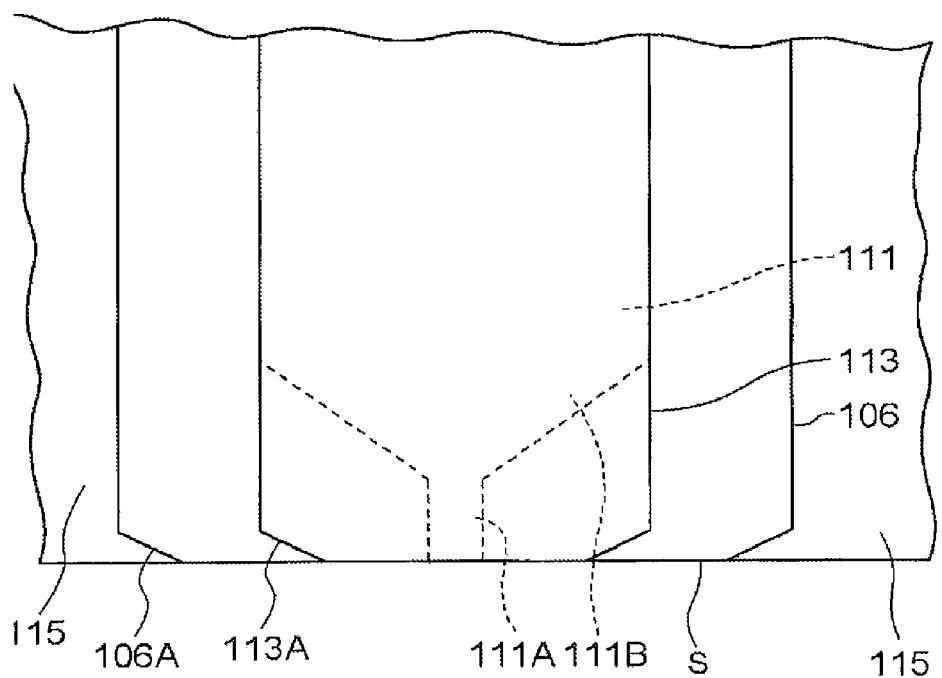
FIG. 21 is a top view showing the layered structure of the magnetic head section of the conventional example.
Figure 22:
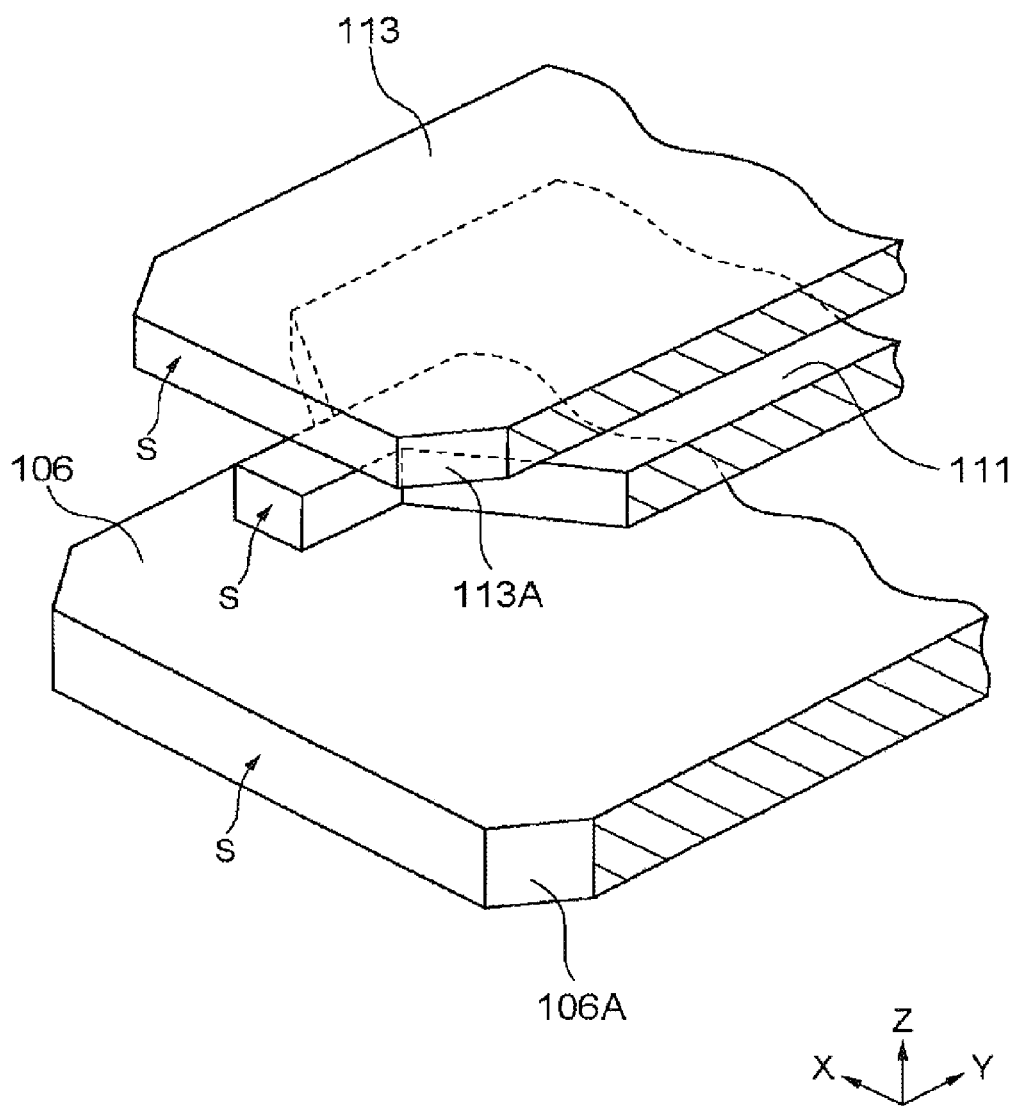
FIG. 22 is a perspective view showing the layered structure of the magnetic head section of the conventional example.
Figure 23A:
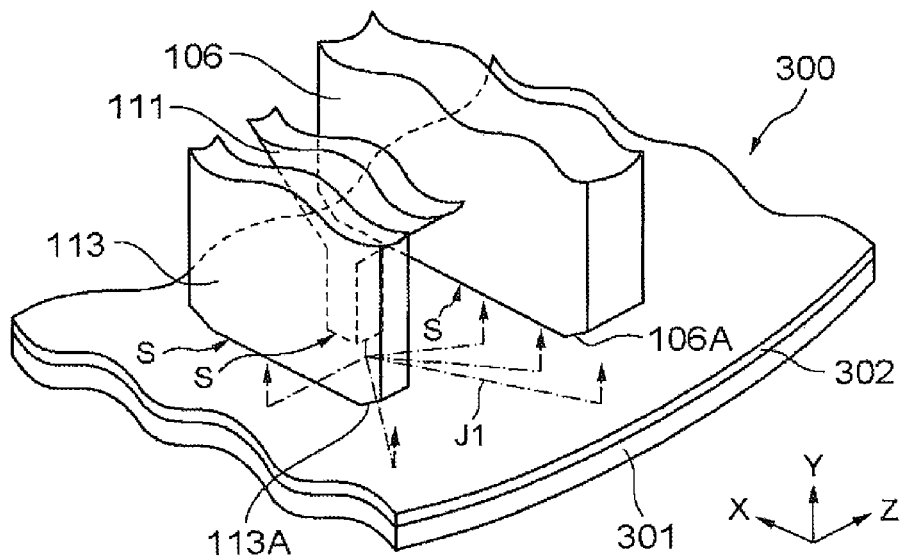
FIG. 23A is a diagram illustrating a flow of a magnetic flux, when writing, of a magnetic head section of a conventional example.
Figure 23B:
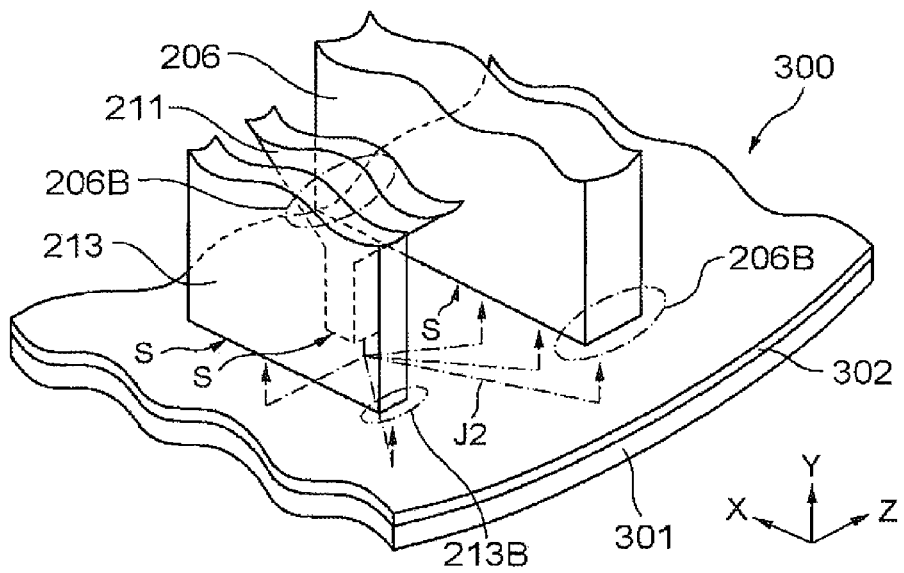
FIG. 23B is a diagram illustrating a flow of a magnetic flux, when writing, of a magnetic head section of a conventional example.

Next, the base 100 on which the magnetic head sections 110 are formed as shown in FIG. 15A is cut into narrow bar blocks 130 (reference numeral 30 in the present embodiment), in each of which a plurality of magnetic head sliders 31 are linked as shown in FIG. 15B (step S2 in FIG. 1, bar block cut-off step). Cutting of the bar blocks 30 is performed such that the block in which a plurality of bar blocks 30 are linked is held by a jig from top and bottom, and bar blocks are cut off one by one by a slicer while being pulled upward and downward, for example. Cutting of the bar blocks 30 is performed after completion of lapping for adjusting write elements and read elements exposed on the flying surface S of each bar to have a predetermined dimension. FIG. 16A shows a cut-off bar block 130. It should be noted that the bar block 130 will be cut into respective magnetic head sliders 131 (reference numeral 31 in the present embodiment) later, as shown by the dotted line in FIG. 16A.

Then, a surface of the bar block 130, forming the flying surface S of the magnetic head slider 131, is lapped by a lapping device (step S3 in FIG. 1, lapping step). With this lapping, the write elements and the read elements exposed on the flying surface S are adjusted to have a final length.

Then, on the lapped surface of the bar block 130 which also serves as the flying surface S of the magnetic head slider 131, an air bearing surface (hereinafter referred to as "flying surface" or "ABS") having predetermined patterns is formed (step S4 in FIG. 1, ABS forming step). In this step, a process of removing end portions of the magnetic shield, which is a characteristic of the present invention, is performed simultaneously (step S5 in FIG. 1, shield end portion removing step). This process will be described later.

Then, the bar block 130 is cut into respective magnetic head sliders 131 with used of a slider cutter (step S6 in FIG. 1, slider cutting step). Thereby, as shown in FIG. 15B, the base 100 part becomes a slider portion (reference numeral 20 in the present embodiment), and a magnetic head slider 131 (reference numeral 31 in the present embodiment) having on its end a magnetic head section 110 (reference numeral 10 in the present embodiment) is formed. Then, predetermined processes such as washing of each of the magnetic head sliders 131 are performed, and manufacturing of the magnetic head sliders 131 ends. It should be noted that the procedures described above are just examples, and the magnetic head slider 131 may be manufactured by means of other procedures and steps.

(Details of Magnetic Head Slider Manufacturing Method)

Next, procedures in a process of removing end portions of magnetic shields performed when forming the ABS (ABS forming step) will be described in detail.

First, the configuration of the magnetic head section 10 which is cut off in the form of a bar block 30 and the flying surface S is lapped as described above, that is, the magnetic head section 10 in a state before ABS formation and removal of end portions of the magnetic shields, will be described with reference to FIGS. 3A to 6. FIG. 3B is a side sectional view of the magnetic head section 10, and FIG. 3A is a cross-sectional view in which FIG. 3B is viewed from the left side.

As shown in FIGS. 3A and 3B, the multi-layered magnetic head section 10 of the present embodiment is configured such that on a substrate 1 (base 100) made of ceramic material such as AlTiC ($Al_2O_3$.TiC), an insulating layer 2 made of aluminum oxide ($Al_2O_3$ (alumina)), a read head section 10A which performs a reading process with use of magneto-resistance (MR) effect, a write head section 10B which performs a writing process by a perpendicular writing system, and an overcoat layer 14 made of alumina or the like, are layered in this order.

The read head section 10A is formed such that a lower shield layer 3, a shield gap film 4, an upper shield and return yoke layer (hereinafter simply referred to as "return yoke layer") 6, are layered in this order. In the shield gap film 4, an MR element 5 working as a magnetic reading device is buried such that one end face thereof is exposed on the air bearing surface S (flying surface) described later. The lower shield layer 3 and the return yoke layer 6 are mainly for magnetically shielding the MR element from the environment, and are magnetic shields in the present invention. The lower shield layer 3 and the return yoke layer 6 are made of a magnetic material such as nickel-iron alloy (NiFe (hereinafter simply referred to as "permalloy (trade name)"); Ni: 80 weight %, Fe: 20 weight %).

The shield gap film 4 works to magnetically and electrically separate the MR element 5 from the lower shield layer 3 and the return yoke layer 6. The shield gap film 4 is made of a non-magnetic and non-conductive material such as alumina. The MR element 5 performs a reading process by means of giant magneto-resistive (GMR) effect or tunneling magneto-resistive (TMG) effect, for example.

The write head unit 10B is configured such that the return yoke layer 6, a gap layer 7 (gap layer portions 7A, 7B, 7C) and a yoke layer 9 in which a thin-film coil 108 is buried, a magnetic pole layer 11 magnetically connected with the return yoke layer 6 via the yoke layer 9 through an opening 7K formed in the gap layer 7, an insulating layer 12, and a write shield layer 13 are layered in this order.

As described above, the return yoke layer 6 works to magnetically shield the MR element 5 from the environment, and also works to flow back a magnetic flux output from the magnetic pole layer 11 via a hard disk (not shown) in the write head unit 10B. The return yoke layer 6 also works to magnetically shield the magnetic pole layer 11, which is a write element, from the environment. The return yoke layer 6 is made of a magnetic material such as permalloy (Ni: 80 weight %, Fe: 20 weight %), for example.

The magnetic pole layer 11 mainly works to contain the magnetic flux generated in the thin-film coil 8, and outputs the magnetic flux to a magnetic disk (not shown). The insulating layer 12 mainly works to magnetically and electrically separate the magnetic pole layer 11 and the write shield layer 13, and is made of a non-magnetic and non-conductive material such as alumina. The write shield layer 13 mainly works to magnetically shield the magnetic pole layer 11 from the environment, and is made of a magnetic material such as permalloy (Ni: 80 weight %, Fe: 20 weight %).

The return yoke layer 6 and the write shield layer 13 work as magnetic shields of the present invention, which are the same as the lower shield layer 3 and the return yoke layer 6 described above. As the layered structure of the magnetic head section 10 is almost the same as that of Patent Document 1, more detailed description is omitted herein.

Figure 4:
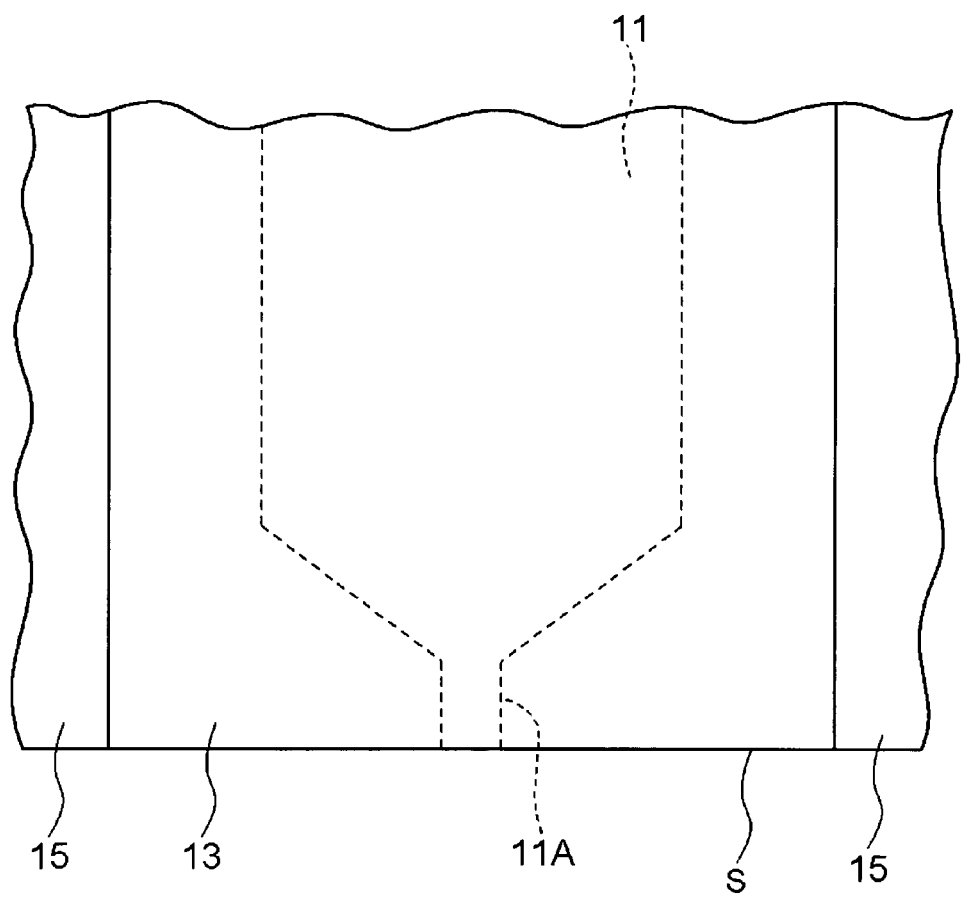
FIG. 4 is a top view showing the layered structure of the magnetic head section.
Figure 5:
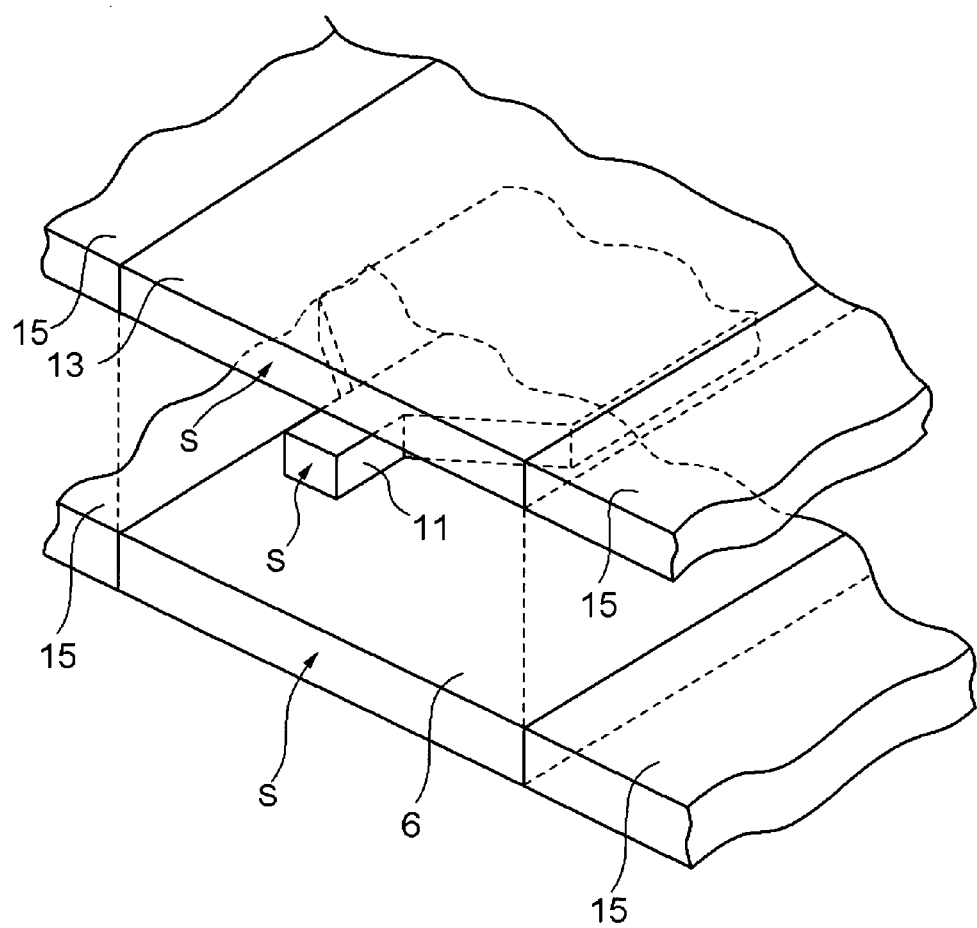
FIG. 5 is a perspective view showing the layered structure of the magnetic head section.

Now, with reference to FIGS. 4 to 6, the detailed configuration of the main part of the magnetic head section 10 will be described. FIG. 4 shows an enlarged plan configuration of the main part of the magnetic head section 10, that is, a view that the magnetic head section 10 shown in FIG. 3A is viewed from the above. FIG. 5 is a perspective view of the main part of the magnetic head section 10, and FIG. 6 is a view of the magnetic head slider 31 on the bar block 30 viewed from the flying surface side.

In this embodiment, the magnetic pole layer 11 which is a write element and the return yoke layer 6 and the write shield layer 13 serving as magnetic shields are described as the main part of the magnetic head section 10. Although the lower shield layer 3 also works as a magnetic shield and end portions thereof are removed as described below in the same manner as those of the return yoke layer 6 and the write shield layer 13, the lower shied layer 3 is omitted in FIGS. 4 and 5.

Figure 6:
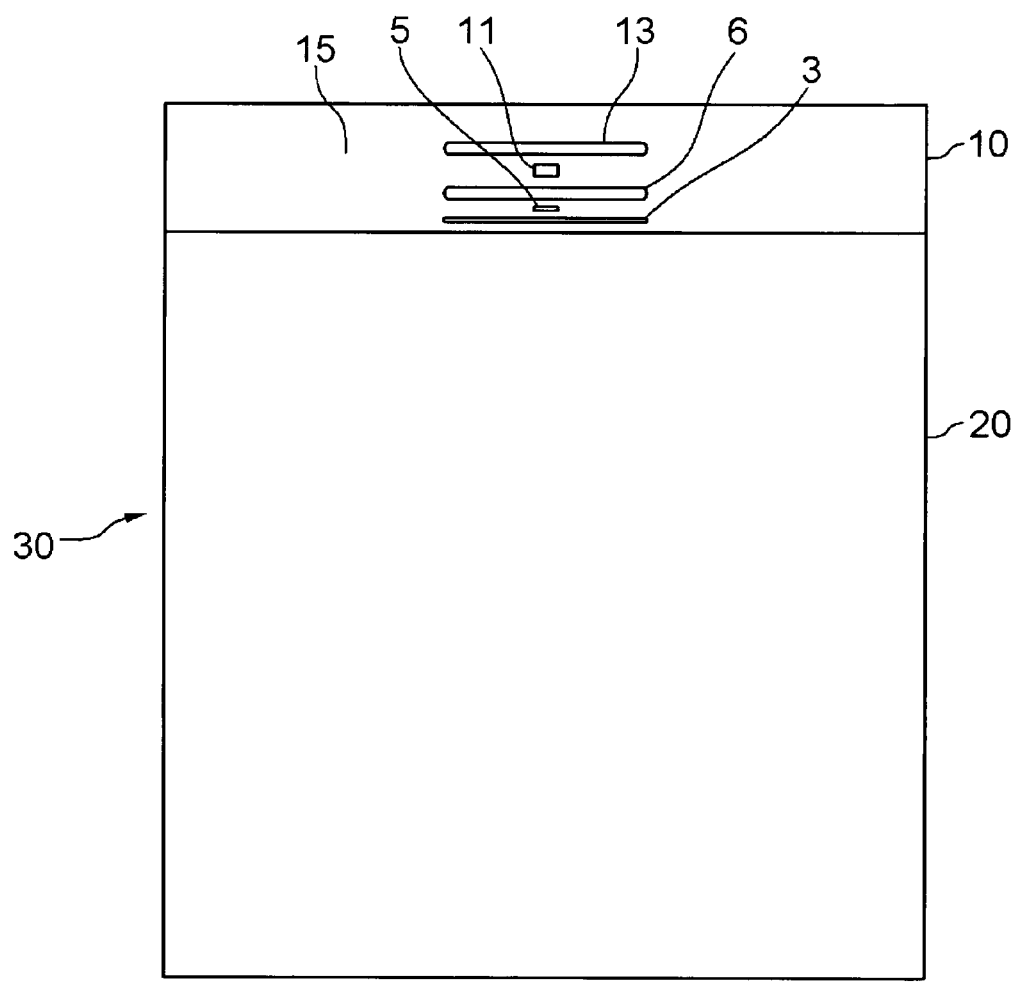
FIG. 6 is a diagram showing the structure of a magnetic head slider.

As shown in FIGS. 4 to 7, one end portion of each of the lower shield 3 (not shown in FIGS. 4 and 5), the MR element 5 (not shown in FIGS. 4 and 5), the return yoke layer 6, the magnetic pole layer 11, and the write shield layer 13 is exposed on the surface S serving as the flying surface (ABS) of the magnetic head slider 31. As shown in FIGS. 4 and 5, the magnetic pole layer 11 is formed such that the portion exposed on the flying surface S is formed as a minute tip 11A having a constant width defining the record track width on a disk. Further, the return yoke layer 6 and the write shield layer 13 are formed such that one end portions thereof are linearly formed along the flying surface S. That is, at this stage, end portions of the return yoke layer 6 and the write shield layer 13, in a width direction of the flying surface S, are not formed as tapered inclined surfaces but are formed at almost right angles as those in Patent Document 1. Further, the insulator 15 is buried in the surroundings of the return yoke layer 6 and the write shield layer 13, as shown in FIG. 6.

Then, an ABS forming process is performed with respect to the magnetic head slider 31 (bar block 30) in the above-described shape (step S4 in FIG. 1), and then, a process of removing end portions of the return yoke layer 6 and the write shield layer 13 which are magnetic shields is performed with respect to the magnetic head section 10 (step S5 in FIG. 1). FIG. 2 shows these procedures, and FIGS. 7 to 9 show respective steps.

Figure 7A:
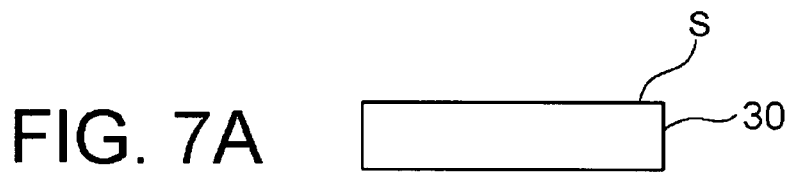
FIG. 7A is a diagram showing a state of a particular step in manufacturing a magnetic head slider.
Figure 7B:
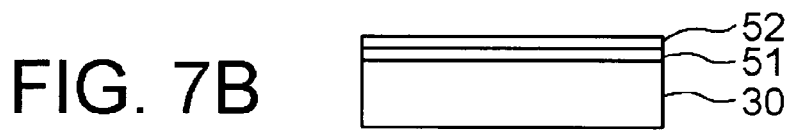
FIG. 7B is a diagram showing a state of a particular step in manufacturing the magnetic head slider.

First, the surface serving as the flying surface S of the magnetic head slider 31, which is the surface of the bar block 30 shown in FIG. 7A, is coated with diamond-like carbon (DLC), whereby two diamond-like carbon (DLC) layers are formed as shown in FIG. 7B (step S11, DLC step in FIG. 2). Although a shield layer of Si or the like is generally formed before formation of DLC, as the shield layer of Si has strong adhesiveness, it is difficult to remove the entire shield layer when removing by milling later. As such, instead of a shield layer of Si, DLC having low inner stress is formed as a first layer, and then DLC is further formed thereon as a second layer. Thereby, the DLC can easily be removed from the flying surface in a latter step.

Figure 7C:
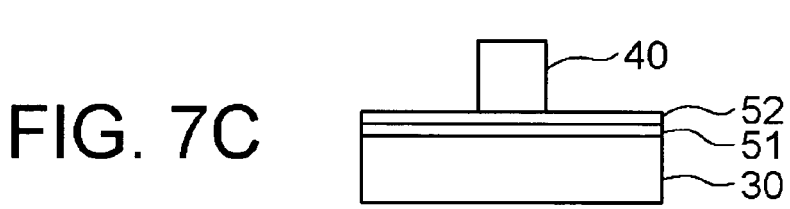
FIG. 7C is a diagram showing a state of a particular step in manufacturing the magnetic head slider.
Figure 9A:
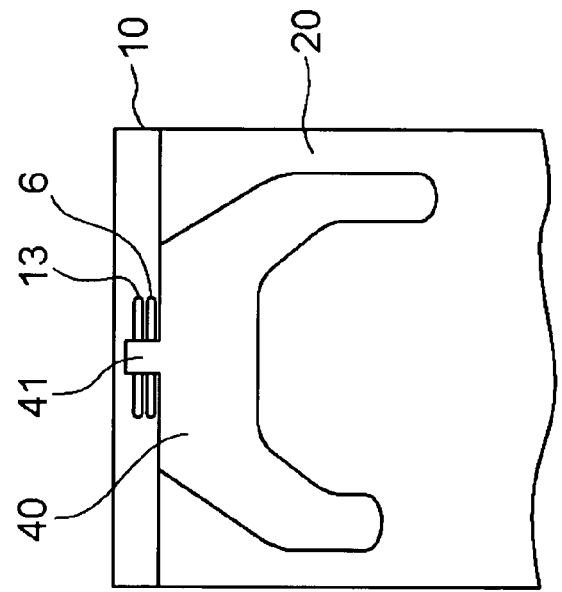
FIG. 9A is a diagram showing a state of a particular step in manufacturing the magnetic head slider.
Figure 9B:
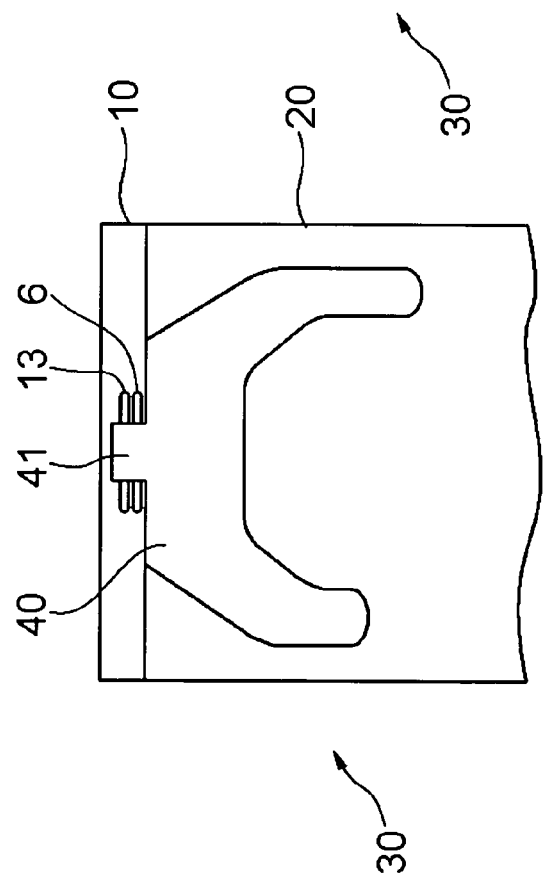
FIG. 9B is a diagram showing a state of a particular step in manufacturing the magnetic head slider.

Then, as shown in FIG. 7C, photoresist is applied onto the two DLC layers 51 and 52, and exposure and development are performed to thereby form a mask 40 (step S12 in FIG. 2, mask forming step). In this step, as shown by the reference numeral 41 of FIG. 9A, the mask 40 is formed to be in a shape covering the MR element 5 which is a read element and the magnetic pole layer 11 which is a write element, and also covering the center portions of the magnetic shields such as the return yoke layer 6 and the write shield layer 13 (see FIG. 6). In other words, the portion indicated by the reference numeral 41 of the mask 40 is formed to have a width such that the portion 41 wholly covers the MR element 5 and the magnetic pole layer 11 but does not cover the both ends in the width direction of the magnetic shields such as the return yoke layer 6 and the write shield layer 13 on the flying surface S. For example, the width is 30 μm in the example shown in FIG. 9A. It should be noted that as the size of the magnetic field concentrating on end portions (edges) of the write shield layer 13 and the like varies according to the structure of the magnetic head section, a recording medium, and the like, the width of the mask (resist) of the portion indicated by the reference numeral 41 is properly adjusted accordingly. The width may have any values, and the width may be 15 μm as shown in FIG. 9B which is narrower than the case shown in FIG. 9A, for example.

Although the mask 40 is also formed on the slider portion 20, this is because ABS of the magnetic head slider 31 is also formed by means of the mask 40. As such, in order to simultaneously form the shallow portion of the ABS, a mask pattern corresponding to the desired ABS shape is formed.

Figure 7D:
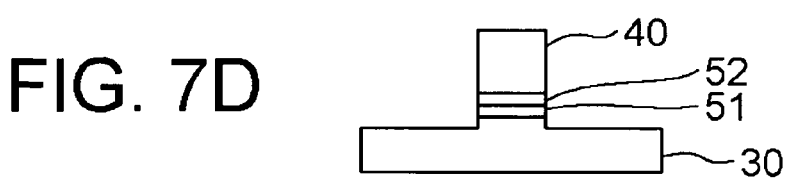
FIG. 7D is a diagram showing a state of a particular step in manufacturing the magnetic head slider.

Then, as shown in FIG. 7D, the portion not covered by the mask 40 is removed by ion milling (step S13 in FIG. 2, removing step). The ion milling performed in this step is called shallow ion milling. This milling is performed with Ar gas for example, in which the Ar flow rate is 9 sccm, the angle is 45 degrees, the voltage is 900V, and the time is 7.5 minutes.

Figure 10:
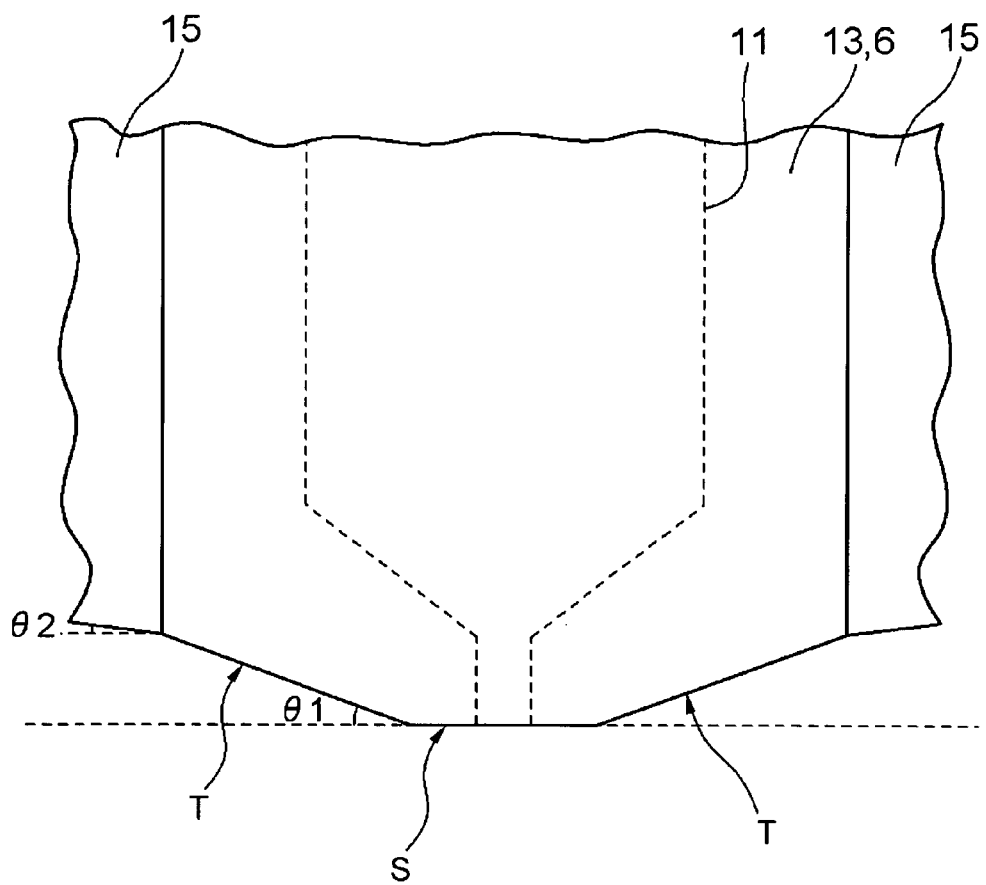
FIG. 10 is a diagram showing a state of a particular step in manufacturing the magnetic head slider.
Figure 11:
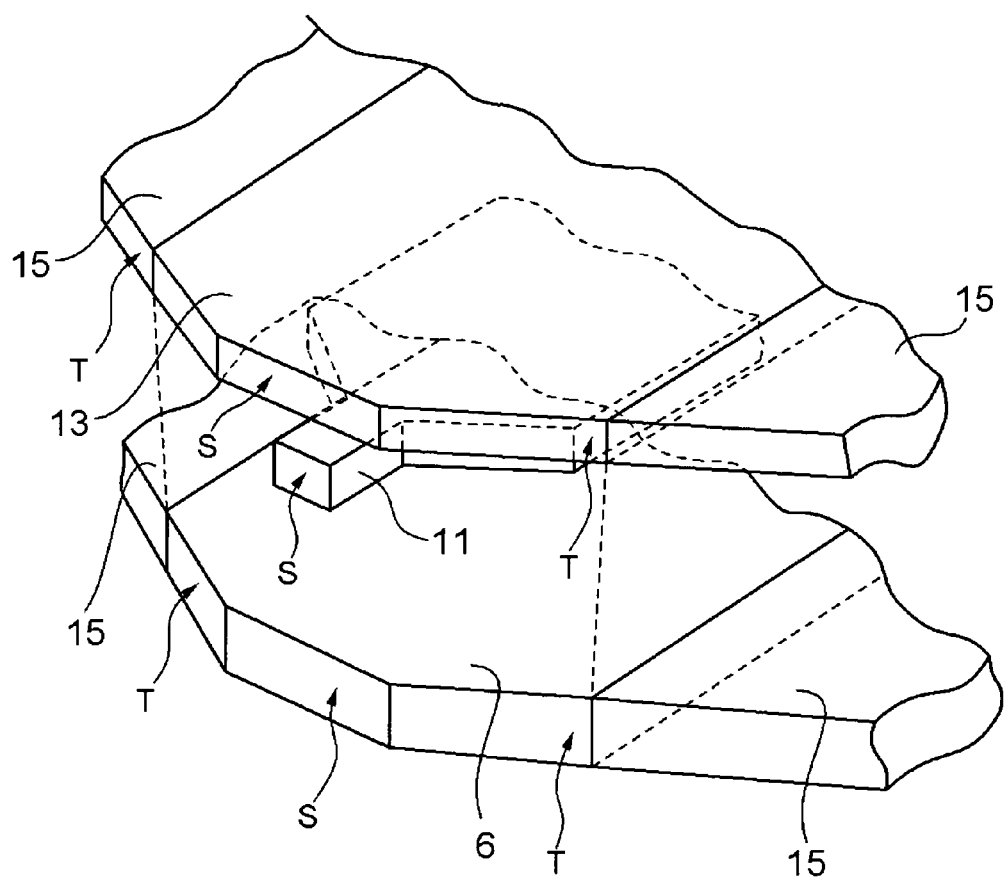
FIG. 11 is a diagram showing a state of a particular step in manufacturing the magnetic head slider.

FIGS. 10 and 11 show the shape of the write shield layer 13 and the like on the flying surface S after the ion milling is performed. As shown in FIGS. 10 and 11, the portion forming the flat flying surface S has been covered by the portion 41 of the mask 40, and the portion from an end thereof to an end of the write shield layer 13 is scraped off at an angle θ1. At this time, the angle θ1 is 8 degrees and the length of scraping in the height direction is 200 nanometers, for example. Further, not only the end portions of the write shield layer 13 and the like but also the insulator 15 (e.g., alumina) located therearound is also scraped off at an angle θ2.

As described above, by removing the end portions in the width direction of the magnetic shield such as the write shield layer 13 by a predetermined depth from the flying surface S in the vertical direction, inclined surfaces T are formed at the end portions of the write shield layer 13. As the removing process is performed after the magnetic head has been formed in a layered manner, the removed portions become empty spaces. That is, the inclined surfaces T formed by the removal become surfaces exposed on the flying surface.

As the slider portion 20 side is also milled together with the removing process described above, a shallow portion of the ABS is milled. In other words, in the present embodiment, removal of the end portions in the width direction of the magnetic shield such as the write shield layer 13 is performed at the same time as shallow milling which is the ABS forming step.

Figure 8A:
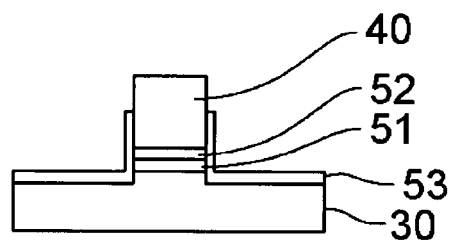
FIG. 8A is a diagram showing a state of a particular step in manufacturing the magnetic head slider.

Then, as shown in FIG. 8A, the milled portion (e.g., inclined surfaces T) are coated with diamond-like carbon (DLC) so as to be protected, whereby a diamond-like carbon layer 53 is formed (step S14 in FIG. 2, second DLC forming step). In this step, a wall surface of the diamond-like carbon layer 53 is formed when the diamond-like carbon layer 53 is applied to the side surface of the existing mask 40.

Figure 8B:
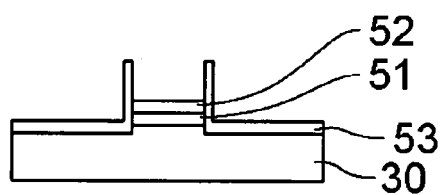
FIG. 8B is a diagram showing a state of a particular step in manufacturing the magnetic head slider.
Figure 8C:
FIG. 8C is a diagram showing a state of a particular step in manufacturing the magnetic head slider.
Figure 8D:
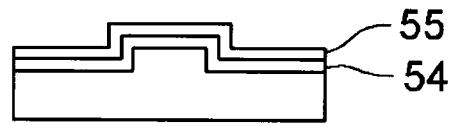
FIG. 8D is a diagram showing a state of a particular step in manufacturing the magnetic head slider.

Then, a further mask is formed in order to form a cavity of the ABS (step S15 in FIG. 2), and a cavity is formed by ion milling (step S16 in FIG. 2). If further milling or the like is required to form the ABS including multi-layered patterns, mask formation and milling are repeated. Then, when the ABS shape is completely formed, the mask 40 (photoresist) formed in the previous steps is removed, as shown in FIG. 8B (step S17 in FIG. 2). In this step, the wall surface of the diamond-like carbon 53 formed in the step S14 remains, as shown in FIG. 8B. This is called fencing. If the fencing is formed in a large size, a risk of crash that the magnetic head slider 31 contacts a medium may be caused. As such, in order to remove the fencing, heavy etching is performed. For example, heavy etching uses a compound gas of Ar and $O_2$, and etching is performed under the conditions that $O_2$ flow rate is 12 sccm (standard cc/min), Ar flow rate is 6 sccm, the angle is 45 degrees, the etching time is 90 seconds, and the acceleration voltage is 500 V, and the etching rate of DLC is 0.67 angstrom/second. Thereby, as shown in FIG. 8C, all of the diamond-like carbon layers 51, 52 and 53 are removed from the flying surface S (step S18 in FIG. 2, DLC removing step).

Then, in order to protect the ABS of the magnetic head slider 31, the entire flying surface S is again coated with diamond-like carbon to thereby form a diamond-like carbon layer (step S19 in FIG. 2, third DLC forming step). In this step, in order to improve the adhesiveness with the flying surface S of the magnetic head slider 31, an Si shield layer 54 is first formed on the flying surface S, and then, the final diamond-like carbon layer 55 is formed to cover the entire ABS. Thereby, the flying surface S is not subjected to dusts or the like, and the risk of head crash is reduced, so that the reliability is improved.

By mounting the magnetic head slider 31 formed as described above (e.g., see FIG. 16B) on the tongue surface of the flexure 61 via a microactuator 62 as shown in FIG. 12 for example, a head gimbal assembly can be configured. Then, a magnetic disk device 70 having the head gimbal assembly is mounted is configured, whereby reading and writing of data can be performed with respect to a magnetic disk.

When reading and writing data, as end portions of the magnetic shields such as yoke shield layer 6 are removed and inclined surfaces are formed, a magnetic flux from the magnetic pole layer 11 or a magnetic flux from the outside do not concentrate on such portions, so that generation of track erase can be prevented and the reliability is improved. In particular, as formation of inclined surfaces of the magnetic shields is performed not during the multi-layer forming step but performed after that step by removing the end portions of the magnetic shields from the flying surface side, even if there are a plurality of magnetic shields, the end portions thereof can be removed simultaneously without performing a complicated step when forming a multi-layer, whereby the manufacturing process becomes simple. Consequently, the manufacturing time is reduced, and further, the manufacturing costs are reduced.

Further, by removing the end portions of the magnetic shields and the surrounding insulator as described above, the removed portions become empty spaces, and the inclined surfaces T of the removed parts are exposed on the flying surface. As such, the distance between the magnetic head section and a magnetic disk can be long, whereby it is possible to prevent the magnetic head section from contacting the magnetic disk. As a result, data reading/writing can be performed stably, and the durability of the magnetic head can be improved.

Further, by removing the fencing formed by the diamond-like carbon layer in the ABS forming process, it is also possible to prevent the magnetic head section from contacting a magnetic disk. Furthermore, as the diamond-like carbon layer covering the ABS is finally formed, it is possible to prevent dusts from being attached on the ABS. As described above, by forming a magnetic disk device using a magnetic head slider formed by the above-described method, the reliability of the magnetic disk device can be improved.

Although the return yoke layer 6 and the write shield layer 13 have been described by way of drawings as examples of magnetic shields in the above description, it is acceptable to also treat the lower shield layer 3 as a magnetic shield and to remove the end portions in the width direction positioned on the flying surface S side. Further, the magnetic shields are not limited to those described above. It is also acceptable to treat those made of magnetic materials functioning as magnetic shields with respect to the read element and the write element as magnetic shield and to remove the end portions in the width direction on the flying surface S as described above.

Further, although the case, in which the step of removing the end portions of the magnetic shields is performed as a part of the ABS forming step, has been described above, that step may be performed separately in a timing other than the ABS forming step. However, the step is preferably performed after the multi-layer forming step, and in order to enable the removing process to be performed from the flying surface side, preferably performed after being cut into bar blocks so that the flying surface is exposed.

It should be noted that although the above description describes one having a "single-magnetic-pole type head" as an example of the magnetic head section 10, it is not limited to this head. For example, the present invention may be applied to manufacturing of a magnetic head slider having a magnetic head section using a "ring-type head".

Further, although the case of manufacturing a complex-type thin film magnetic head has been described above, the present invention is not limited to this case. The present invention is applicable to a thin film head dedicated for writing having a conductive magnetic conversion element for writing, and to a thin film head having a conductive magnetic conversion element for both reading and writing. Further, the present invention is also applicable to a thin film magnetic head having a structure in which an element for writing and an element for reading are layered in an inverse order. Furthermore, the present invention is also applicable not only to a perpendicular recording-type thin film magnetic head but also to a longitudinal recording-type (in-plane recording type) thin film magnetic head.

As the method of manufacturing a magnetic head slider according to the present invention can be utilized for manufacturing a magnetic head slider which is to be mounted on a magnetic disk device and performs reading and writing of data with respect to a magnetic disk, the present invention has industrial applicability.

What is claimed is:

1. A method of manufacturing a magnetic head slider, including a multi-layer forming step for forming a magnetic head section in a multi-layered manner, the magnetic head section including a read element and/or a write element and a magnetic shield for magnetically shielding the read element and/or the write element, the magnetic head slider being manufactured by being cut off from a multi-layered body having the magnetic head section, the method comprising:

after the multi-layer forming step, a shield end removing step for removing end portions in a width direction of the magnetic shield located on a flying surface side of the magnetic head slider, and following the multi-layer forming step, a bar block cut-off step for cutting off a bar block having a plurality of magnetic head sliders from the multi-layered body;

a slider cutting step for cutting the bar block into respective magnetic head sliders, wherein the shield end removing step is performed after the bar block cut-off step; and before or after the slider cutting step, an ABS forming step for forming an air bearing surface in a predetermined shape on the flying surface of the magnetic head slider, wherein the shield end removing step is performed as a part of the ABS forming step, and wherein the shield end removing step includes:

a DLC step for forming a diamond-like carbon layer on the flying surface;

a mask forming step for forming, on the flying surface of the magnetic head slider, a mask covering the read element and/or the write element and a center portion of the magnetic shield except for the end portions in the width direction thereof; and a removing step for removing a portion uncovered by the mask to a predetermined depth from the flying surface side; and wherein the shield end removing step includes:

after the removing step, a second DLC forming step for forming a diamond-like carbon layer on the flying surface; and after the second DLC forming step, a DLC removing step for removing all of the diamond-like carbon lay formed on the flying surface, after performing a predetermined process on the flying surface.

2. The method of manufacturing a magnetic head slider according to claim 1, further comprising:

after the ABS forming step, a third DLC forming step for forming a diamond-like carbon layer covering the flying surface.

3. The method of manufacturing a magnetic head slider according to claim 1, wherein the magnetic shield has a function of flowing back a magnetic flux generated from the write element.

4. The method of manufacturing a magnetic head slider according to claim 1, wherein the magnetic shield has a function of flowing back a magnetic flux generated from the write element.

5. A method of manufacturing a magnetic head slider, including a multi-layer forming a magnetic head section in a multi-layered manner, the magnetic head section including a read element and/or a write element and a magnetic shield for magnetically shielding the read element and/or the write element, the magnetic head slider being manufactured by being cut off from a multi-layered body having the magnetic head section, the method comprising:

after forming the multi-layer, removing end portions in a width direction of the magnetic shield located on a flying surface side of the magnetic head slider, and following forming of the multi-layer, cutting off a bar block having a plurality of magnetic head sliders from the multi-layered body;

cutting the bar block into respective magnetic head sliders, wherein removing of the shield end is performed after cutting the bar block; and before or after the cutting of the bar block into respective magnetic head sliders, forming an air bearing surface (ABS) in a predetermined shape on the flying surface of the magnetic head slider, wherein removing of the end portions is performed as a part of forming of the ABS, and wherein the removing of the end portions includes:

forming a layer comprising diamond-like carbon (DLC) on the flying surface;

forming, on the flying surface of the magnetic head slider, a mask covering the read element and/or the write element and a center portion of the magnetic shield except for the end portions in the width direction thereof; and removing a portion uncovered by the mask to a predetermined depth from the flying surface side, wherein removing of the end portions includes after the removing of the portion uncovered by the mask, forming a layer comprising DIX: on the flying surface; and then removing all of the layer comprising DLC formed on the flying surface, after performing a predetermined process on the flying surface.

6. The method of manufacturing a magnetic head slider according to claim 5, further comprising after forming of the ABS, forming a layer comprising DLC covering the flying surface.

7. The method of manufacturing a magnetic head slider according to claim 5, wherein the magnetic shield has a function of flowing back a magnetic flux generated from the write element.

8. The method of manufacturing a magnetic head slider according to claim 5, wherein the magnetic shield has a function of flowing back a magnetic flux generated from the write element.

* * * * *